(12) United States Patent
Leigh et al.

(10) Patent No.: US 11,385,418 B2
(45) Date of Patent: Jul. 12, 2022

(54) RECONFIGURABLE FIX-SHUFFLED WAVEGUIDES WITH MODULAR SIMPLEX FERRULES

(71) Applicant: HEWLETT PACKARD ENTERPRISE DEVELOPMENT LP, Houston, TX (US)

(72) Inventors: Kevin B. Leigh, Houston, TX (US); John R. Grady, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/011,810

(22) Filed: Sep. 3, 2020

(65) Prior Publication Data
US 2022/0066107 A1 Mar. 3, 2022

(51) Int. Cl.
*G02B 6/40* (2006.01)
*G02B 6/38* (2006.01)

(52) U.S. Cl.
CPC ........... *G02B 6/406* (2013.01); *G02B 6/3825* (2013.01); *G02B 6/3885* (2013.01)

(58) Field of Classification Search
None
See application file for complete search history.

(56) References Cited

U.S. PATENT DOCUMENTS

| 4,579,418 | A | * | 4/1986 | Parchet | G02B 6/3831 385/60 |
| 8,422,846 | B2 | | 4/2013 | Ruiz et al. | |
| 9,417,418 | B2 | | 8/2016 | Eberle, Jr. et al. | |
| 9,488,788 | B2 | | 11/2016 | Murray et al. | |
| 9,753,229 | B2 | * | 9/2017 | Murray | G02B 6/3608 |
| 9,846,283 | B2 | * | 12/2017 | Pepe | G02B 6/3879 |
| 2019/0219788 | A1 | | 7/2019 | Childers et al. | |
| 2019/0250339 | A1 | * | 8/2019 | Yang | G02B 6/3821 |

FOREIGN PATENT DOCUMENTS

KR 101548705 4/2015

* cited by examiner

*Primary Examiner* — Omar R Rojas
(74) *Attorney, Agent, or Firm* — Sheppard Mullin Richter & Hampton LLP

(57) ABSTRACT

Systems and assemblies are provided for reconfigurable waveguide (RWG) blocks having fixed waveguides therein. The RWG blocks can receive multiple self-aligned simplex ferrules to achieve customized fiber shuffles that are reconfigurable. A RWG block assembly includes the RWG block with fixed waveguides, a parallel-fiber ferrule interface to install a parallel-fiber ferrule, a plurality of simplex ferrule interfaces to install one or more simplex ferrules which allows the simplex ferrules to be positioned modularly within the RWG block assembly. The fixed waveguides allow optically coupling between the parallel-fiber ferrule and the one or more simplex ferrules via the RWG block. An assembly can also include a RWG block housing with the RWG block installed therein, and a carrier bracket coupled to the RWG block housing that receives a plurality of simplex ferrules such that each of the plurality of simplex ferrules can be positioned modularly and self-aligned within the carrier bracket.

5 Claims, 15 Drawing Sheets

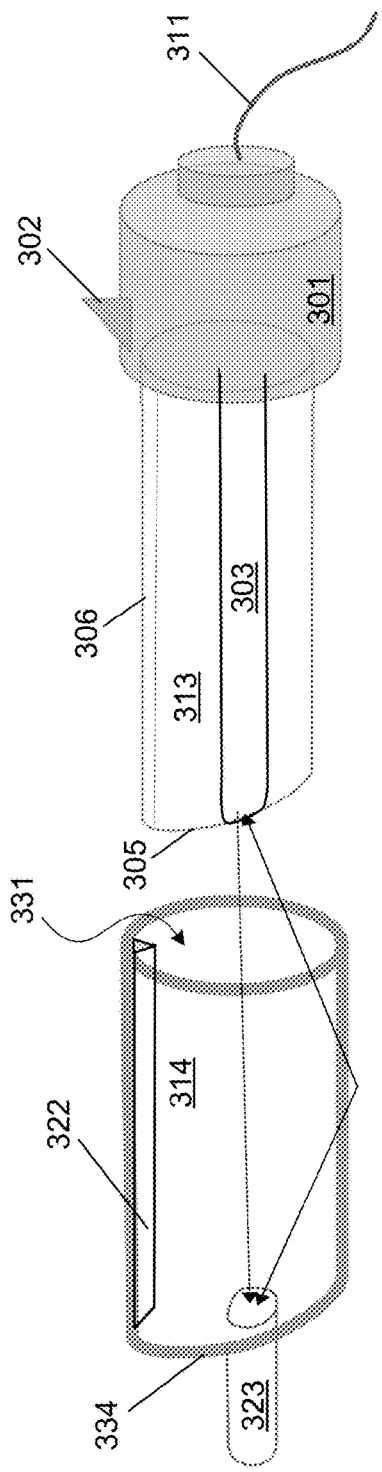
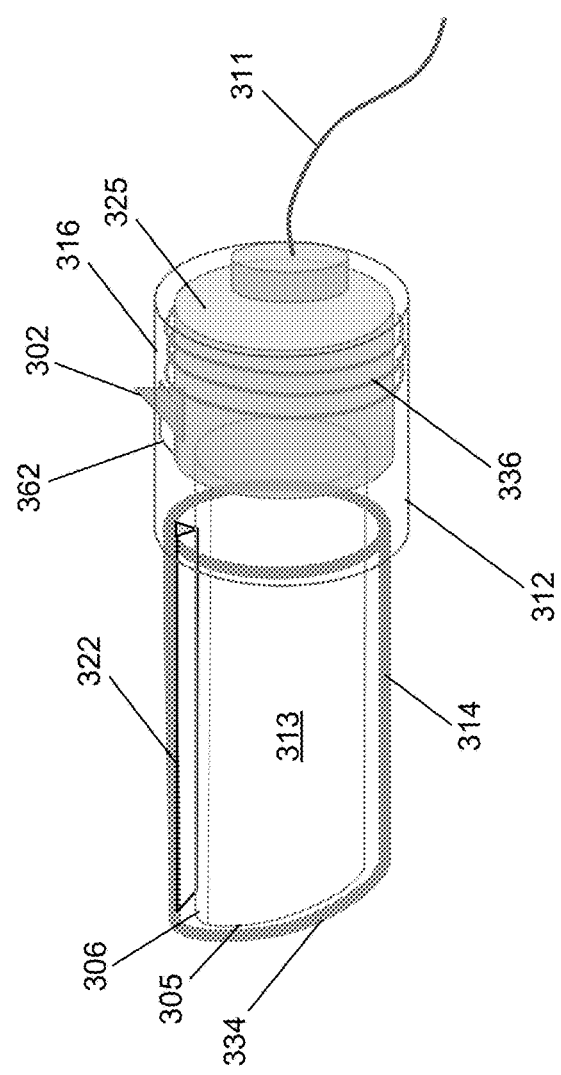
FIG. 3A
FIG. 3B

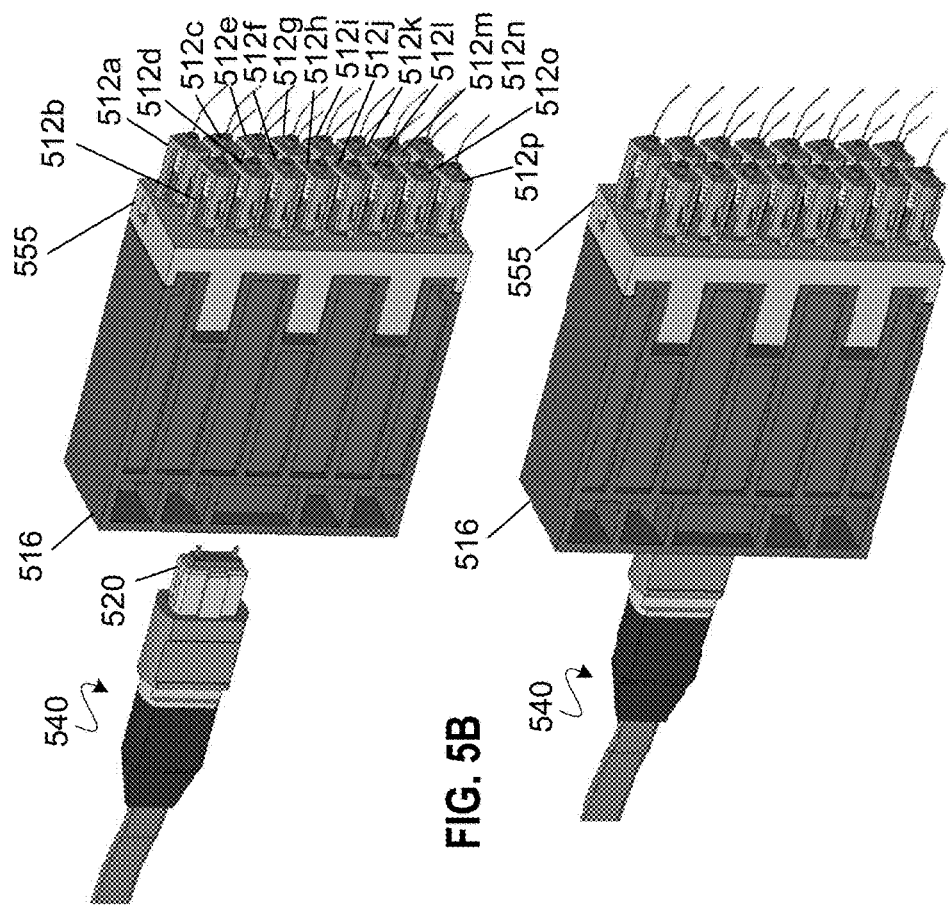
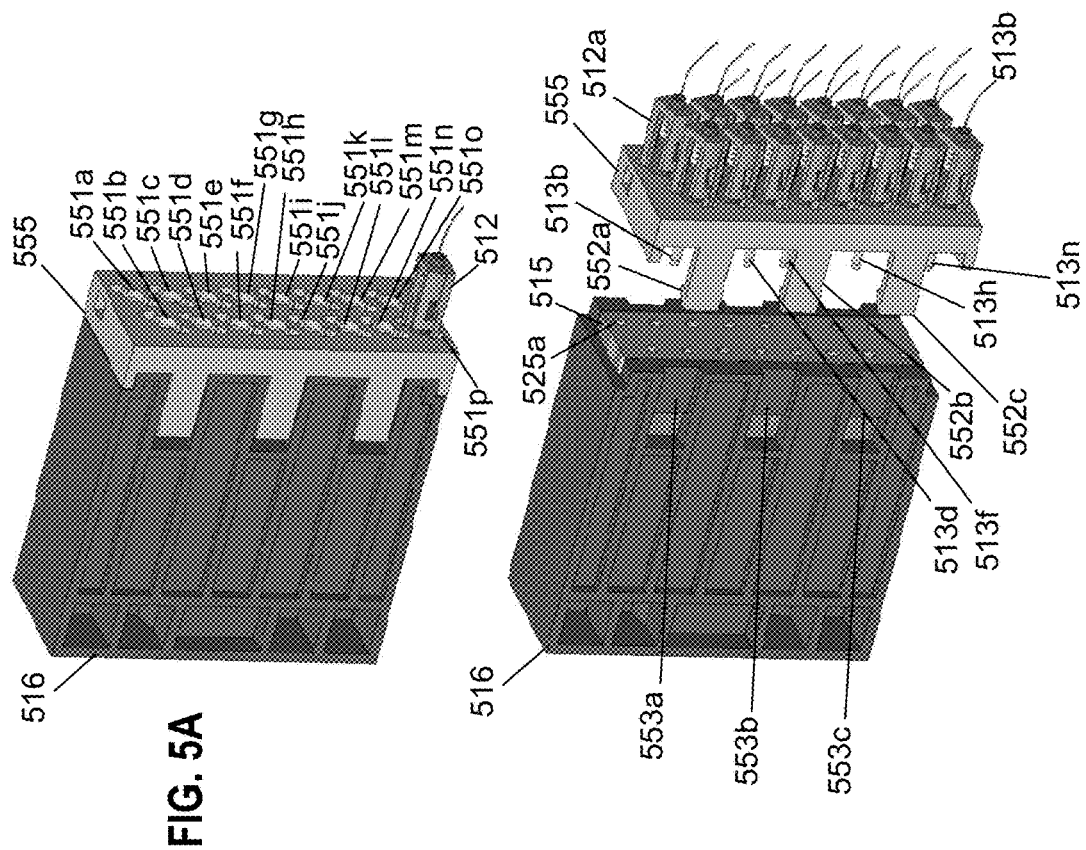

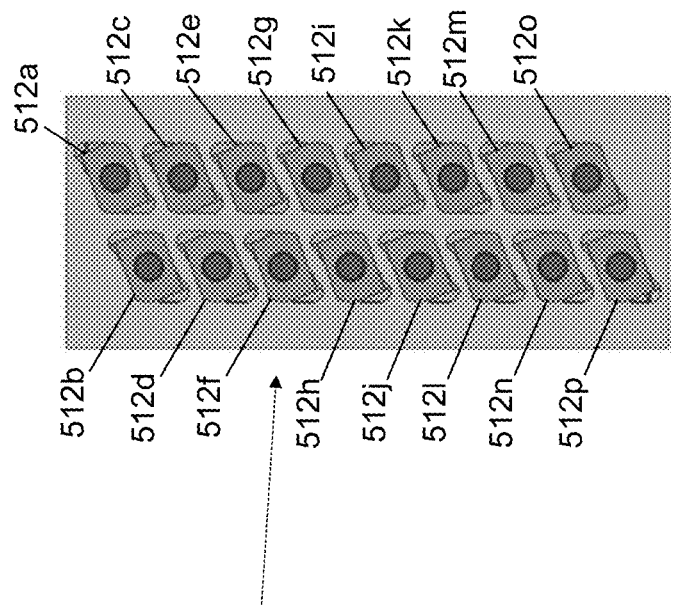
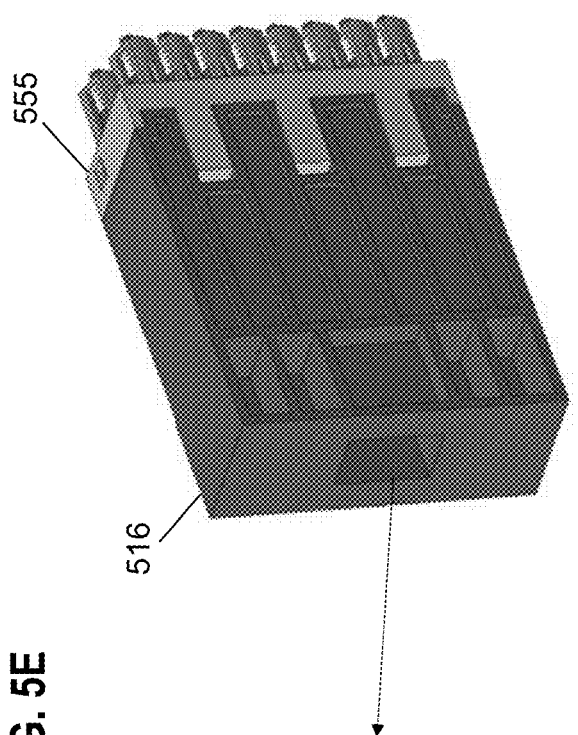
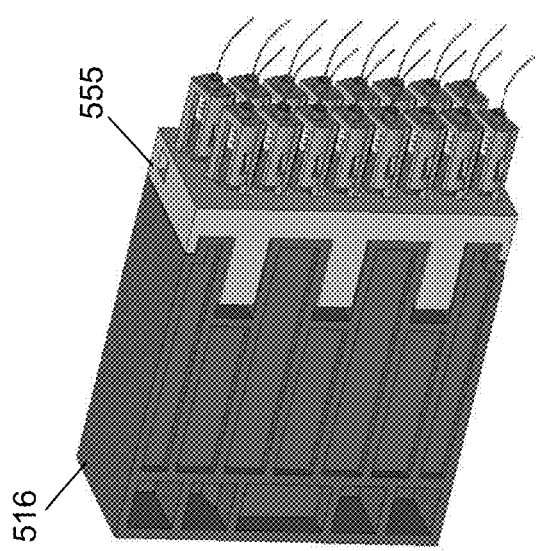
FIG. 5E
FIG. 5F

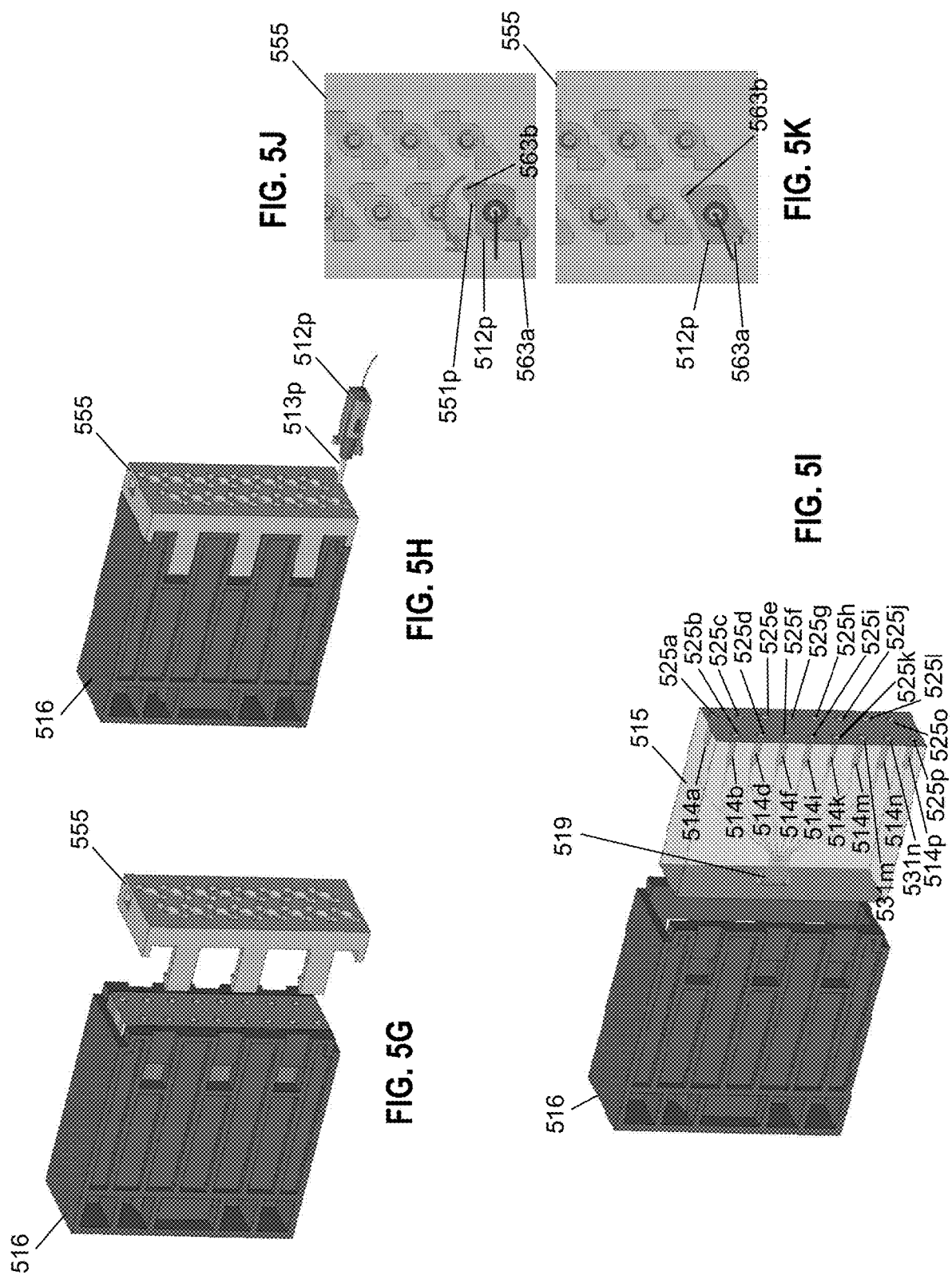

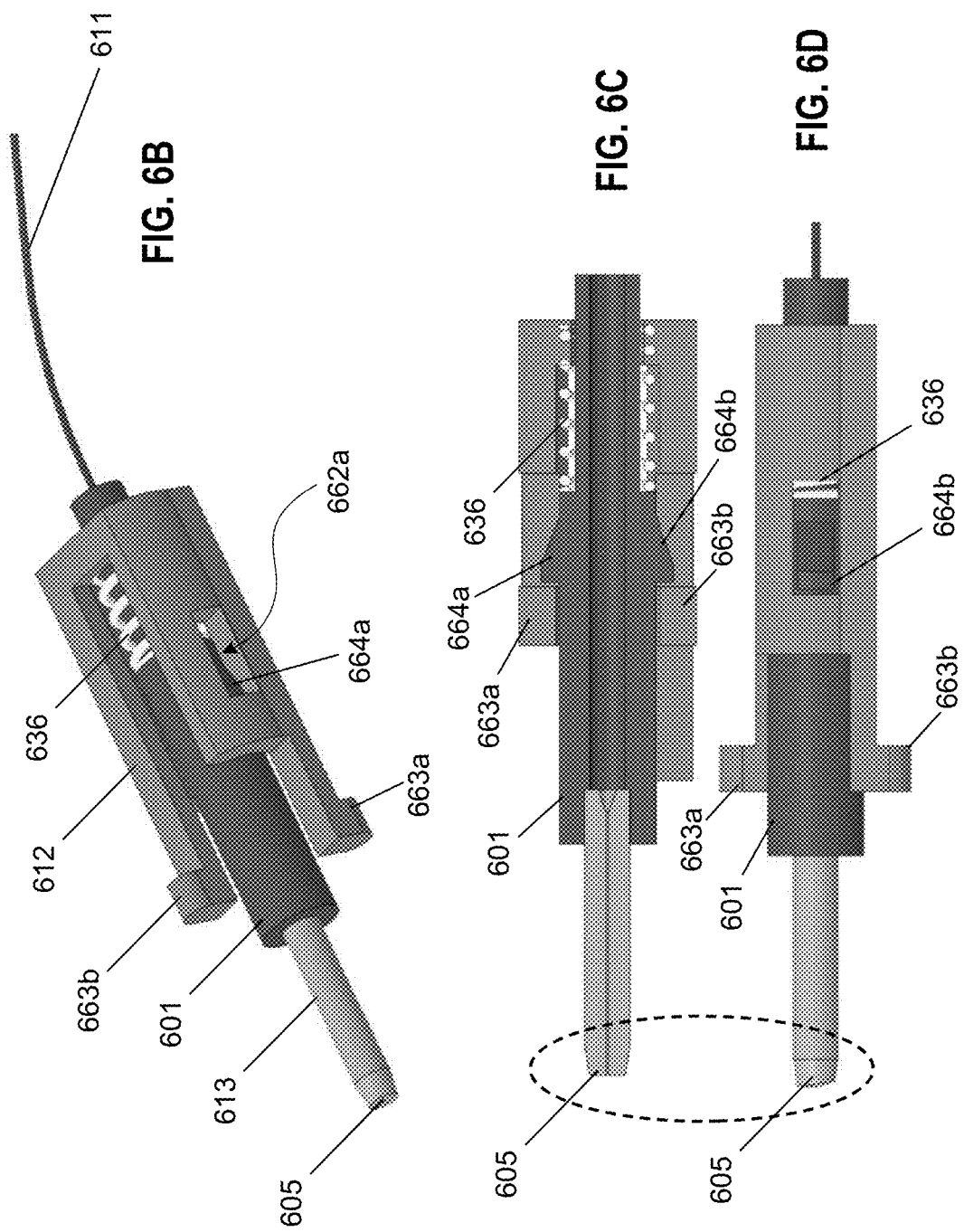

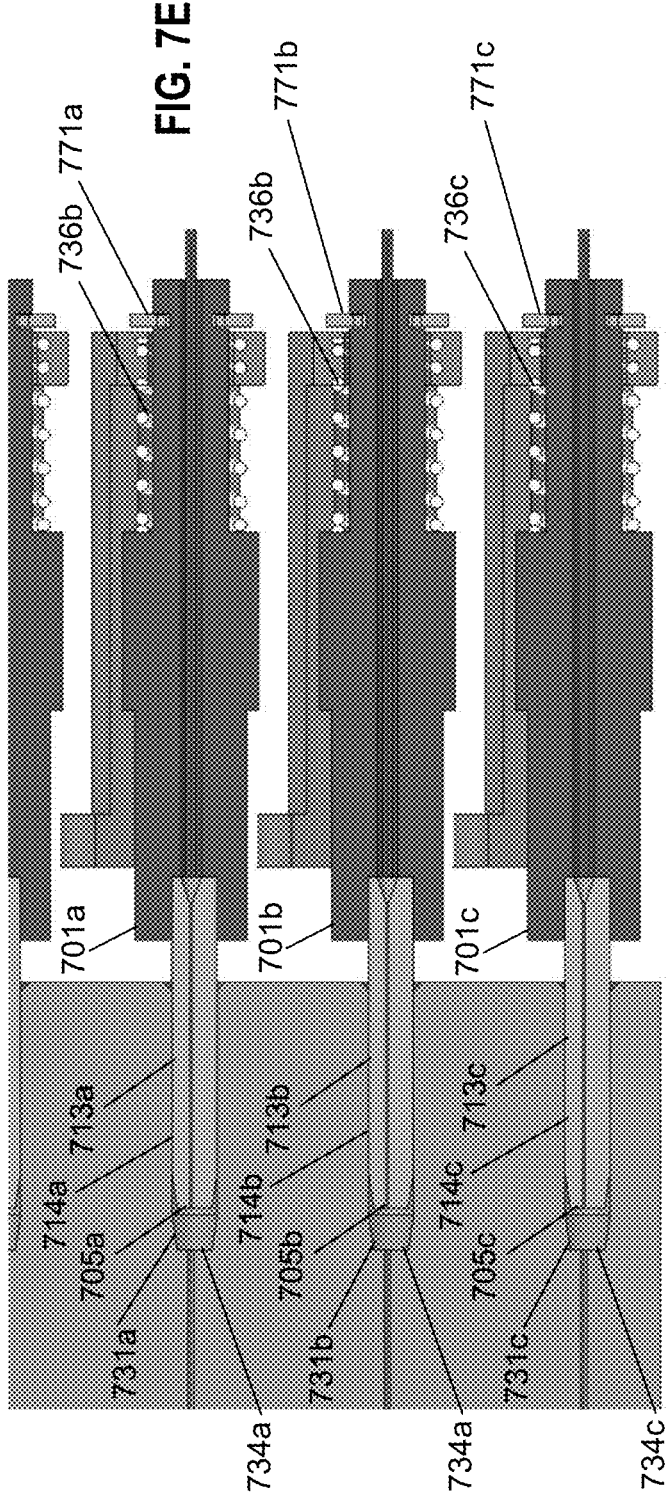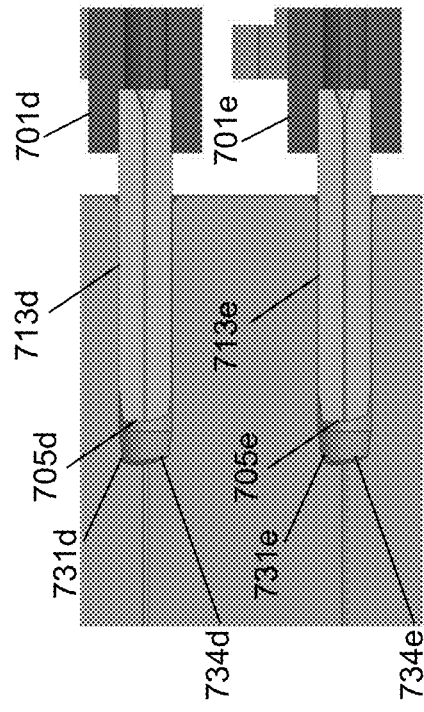

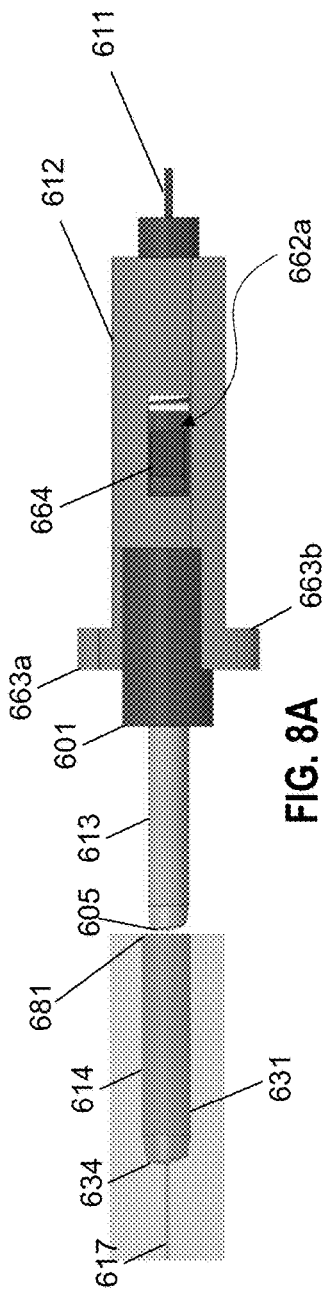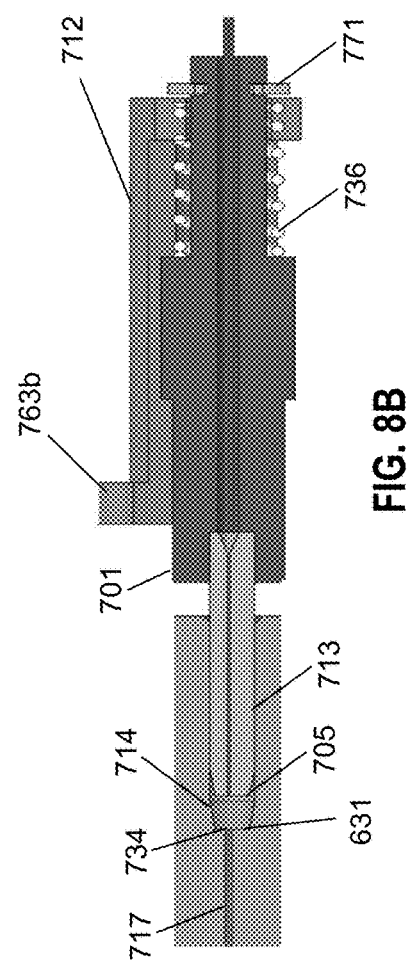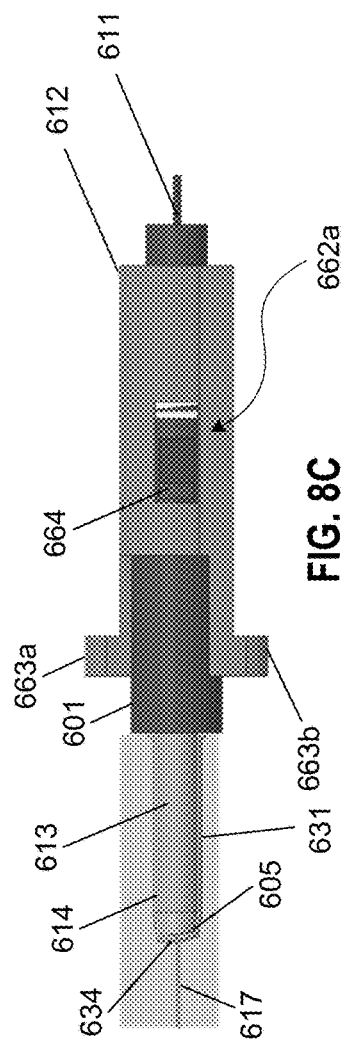
FIG. 8A
FIG. 8B
FIG. 8C

RECONFIGURABLE FIX-SHUFFLED WAVEGUIDES WITH MODULAR SIMPLEX FERRULES

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output, and for some applications, optical fibers may be coupled to other optical fibers and/or system components by an optical connector. As newer classes of systems having integrated high-density optics emerge, the need for complex fiber shuffles, which allow for cross-connecting optical fibers within such systems (and across fabric systems having switches), may exist.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A is an example of a simplex ferrule and a simplex ferrule interface implemented in the RWG block assembly of FIG. 2A, according to some embodiments.

FIG. 3B is an example of the simplex ferrule installed in the simplex ferrule interface shown in FIG. 3A, according to some embodiments.

FIG. 5A depicts a perspective view of an example configuration for a RWG block housing with a carrier bracket installed thereon, and including a simplex ferrule installed on the carrier bracket, according to some embodiments.

FIG. 5B depicts a perspective view of the RWG block housing with the carrier bracket connected thereto shown in FIG. 5A, and including an array of simplex ferrules installed on the carrier bracket and a parallel-fiber ferrule connector installed in RWG block housing, according to some embodiments.

FIG. 5C depicts a perspective view of the RWG block housing with the carrier bracket unattached, and including an array of simplex ferrules installed on the carrier bracket, according to some embodiments.

FIG. 5D depicts a perspective view of the RWG block housing with the carrier bracket connected thereto shown in FIG. 5A, including the parallel-fiber ferrule connector inserted into the RWG block housing and the array of simplex ferrules installed on the carrier bracket, according to some embodiments.

FIG. 5E depicts a perspective view of the RWG block housing with the carrier bracket connected thereto shown in FIG. 5A, including a parallel-fiber ferrule receptacle and the array of simplex ferrules installed on the carrier bracket, according to some embodiments.

FIG. 5F depicts a perspective view of the RWG block housing with the carrier bracket connected thereto shown in FIG. 5A, including the array of simplex ferrules installed on the carrier bracket, according to some embodiments.

FIG. 5G depicts a perspective view of the RWG block housing with RWG block installed therein, and the carrier bracket unattached, according to some embodiments.

FIG. 5H depicts a perspective view of the RWG block housing with the carrier bracket connected thereto shown in FIG. 5A, including a simplex ferrules positioned to be installed on the carrier bracket, according to some embodiments.

FIG. 5I depicts a perspective view of the RWG block housing with the RWG block positioned to be installed therein, according to some embodiments.

FIG. 5J depicts a close-up view of the carrier bracket including a simplex ferrule holder partially installed therein, according to some embodiments.

FIG. 5K depicts a close-up view of the carrier bracket including a simplex ferrule holder fully installed therein, according to some embodiments.

FIG. 6B is a perspective view of the simplex ferrule holder with the simplex ferrule installed therein, according to some embodiments.

FIG. 6C is a cross-sectional view of the simplex ferrule holder with the simplex ferrule installed therein, according to some embodiments.

FIG. 6D is a side view of the simplex ferrule holder with the simplex ferrule installed therein, according to some embodiments.

FIG. 7E is a cross-sectional view that illustrates an array of simplex ferrule holders shown in FIG. 7A installed in corresponding simplex ferrule interfaces, according to some embodiments.

FIG. 7F is a cross-sectional view that illustrates a close-up view of the simplex ferrule holders shown in FIG. 7A installed in corresponding simplex ferrule interfaces, according to some embodiments.

FIG. 8A depicts a simplex ferrule installed in a simplex ferrule holder shown in FIG. 6B, and positioned to be installed in a simplex ferrule interface, according to some embodiments.

FIG. 8B is a cross-sectional view that depicts a simplex ferrule installed in a simplex ferrule holder shown in FIG. 7A, installed in a simplex ferrule interface, according to some embodiments.

FIG. 8C depicts a simplex ferrule installed in a simplex ferrule holder shown in FIG. 6B, installed in a simplex ferrule interface, according to some embodiments.

Figure 1:
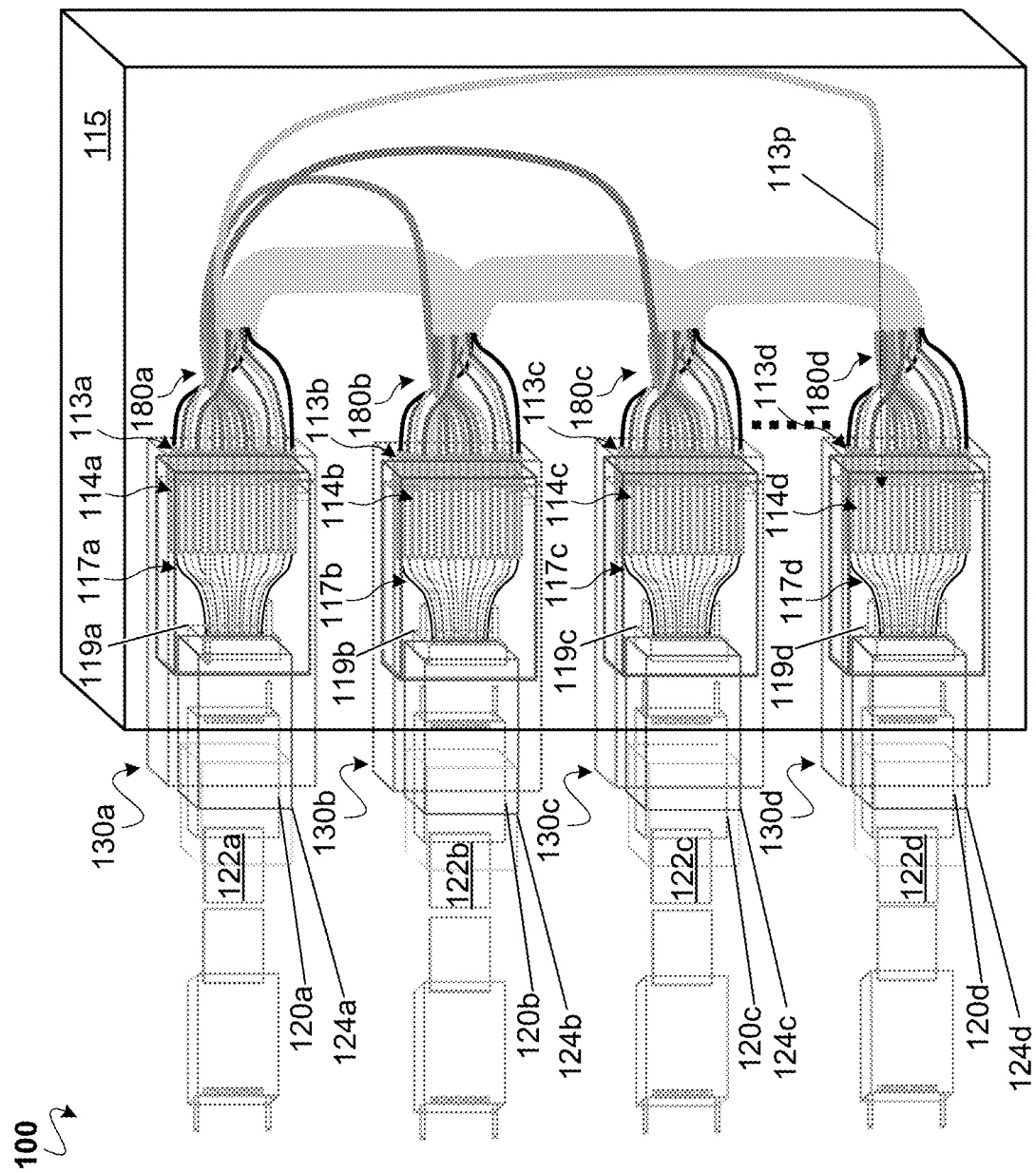
FIG. 1 is a diagram of an example of an optical connectivity system, including multiple reconfigurable waveguide (RWG) block assemblies, according to some embodiments.

The figures are not exhaustive and do not limit the present disclosure to the precise form disclosed.

DETAILED DESCRIPTION

Various embodiments described herein are directed reconfigurable waveguide (RWG) blocks having fixed waveguides therein, and multiple self-aligned simplex-fiber ferrules (also referred to herein as simplex ferrules) to achieve customized optical signal shuffles (e.g., without using traditional fiber shuffles). For purposes of discussion, the various mechanisms and techniques of the disclosed embodiments may be referred to herein as reconfigurable waveguide (RWG) block assemblies.

A fiber shuffle can be described as a solution for cross-connecting optical fibers, for example from multiple ribbon inputs to reconfigured multiple ribbon outputs. Optical shuffling can be accomplished with various fiber routing and packaging schemes. In an example of a conventional fiber shuffle configuration, fibers are ribbonized into fiber arrays, and one fiber from each of the arrays connects to a corresponding fiber of the output arrays. The fiber crossovers are housed in a "black box" that can be referred to as the fiber shuffle.

Existing fiber shuffle assemblies can experience various drawbacks in deployed optical systems, especially in large scale optical systems which require complex fiber shuffle assemblies. For instance, these conventional fiber shuffle assemblies are often expensive, have long lead-time, have fixed connectivity among multiple parallel-fiber ferrules. In many cases, creating an assembly using convention fiber shuffles is time consuming and labor-intensive process, taking hours to create an assembly.

Additionally, assembling a fiber shuffle may require that different part numbers be used when different fiber lengths are needed. For example, multiple fixed assembly part numbers may be needed even for configurations that are only slightly different from each other. Having such variation (e.g., parts used) in the fiber shuffles can lead to unpredictability and less repeatability of the connections, even more so in systems that include a large number of fiber shuffles in its configuration.

Some commonly used optical fiber shuffle assemblies have optical fibers interfacing among multiple parallel-fiber ferrules, which may provide some flexibility. The "flexibility" of this type of fiber shuffle can be a result of having the parallel-fiber ferrules terminated with simplex ferrules mating within simplex ferrule adapter arrays. Although this fiber shuffle has flexibility, the configuration (e.g., using simplex ferrule adapter arrays) can also lead to increased cost due to additional fiber and connector stages. Furthermore, this fiber shuffle configuration would require a larger amount of space within the system be dedicated to the fiber shuffle in order to accommodate the use of simplex ferrule adapters. Also, multiple reworks may be involved during the initial assembly creation, where the parallel-fiber ferrules need to be removed and re-terminated to fiber arrays. In addition, some existing fiber shuffles employ laser-written waveguides in glass block. However, this configuration is very limited in size and complexity (i.e., only 1:1 simple routed waveguides with fixed fiber terminations).

Also, there are other considerations and difficulties that may be encountered with using conventional fiber shuffles. For instance, the fiber lengths need to be appropriately sized during the shuffle assembly creation (i.e., by fiber assembly house). This creates the potential hazard of having to rebuild the entire fiber shuffle assembly after finding out there are mis-sized fibers during system assemblies, which causes project delays and additional costs (associated with the rebuild). Moreover, in many cases, parallel-fiber ferrules for use with integrated circuit (IC) chips are not practical to be assembled at fiber assembly houses.

In contrast to the aforementioned fiber shuffles, the RWG block assemblies, as disclosed herein, provide low-cost and modularly installable fiber shuffles that can interface among various types of parallel-fiber ferrules including, but not limited to: chip ferrules; faceplate ferrules; blindmate ferrules; fixed shuffle assembly ferrules; and the like. Reconfigurability of fiber shuffles using the disclosed RWG block assemblies can improve the assembly process, as compared to conventional fiber shuffles, by providing a fast turn-around time and minimizing variation within the shuffle (e.g., multiple assembly part numbers).

Furthermore, the disclosed RWG block assemblies allow for "flexibility" associated with reconfigurable fiber shuffles by employing fixed waveguide blocks and multiple self-aligned simplex-fiber ferrules. As a general description, each RWG block assembly includes a parallel-fiber ferrule interface on a first end, and a plurality of simplex ferrule interfaces on the second end to modularly and re-configurably accept simplex ferrules. A RWG block assembly also includes multiple fixed waveguides, where each waveguide can optically couple a parallel-fiber ferrule to a simplex ferrule within the RWG block. Examples of configurations and techniques for the RWG block assemblies, according to the embodiments, are described in detail herein.

Further, multiple RWG blocks assemblies may be grouped together in a housing in a manner that allows for fiber management, hiding connection complexity, and protecting the installed simplex ferrules. Consequently, constructing an optical connectivity system using the disclosed RWG block assemblies can realize several advantages over conventional fiber shuffles (described above), such as: cost and space efficiencies; field configurability (by trained persons); and eliminating additional fiber stage and connector stage to provide modularly configurable/reconfigurable fiber shuffles. Furthermore, the disclosed RWG block assemblies can be used in various high-density or optical systems, such as high-performance computing (HPC), Hyperscale computing, rack-scale, blade systems, and network switch products.

FIG. 1 is a diagram of an example of an optical connectivity system 100, including multiple RWG block assemblies 130a-130d that implement a reconfigurable and modular fiber shuffle. In the illustrated example, four RWG block assemblies 130a-130d are installed, arranged in parallel to each other, at one side of the shuffle box 115. Each of the RWG block assemblies 130a-130d have an array of simplex ferrule interface 114a-114d on one end surface, respectively. Also, each of the RWG block assemblies 130a-130d have a parallel-fiber ferrule interface 119a-119d on the opposing end surface, respectively. Multiple simplex ferrules 113a-113d terminated with simplex fiber sets 180a-180d can be installed in simplex ferrule interface 114a-114d. Multiple parallel-fiber ferrules 120a-120d correspondingly terminated with ribbon fibers 122a-122d can be installed in parallel-fiber ferrule alignment and retention area 124a-124d to interface with a parallel-fiber ferrule interface 119a-119d.

For purposes of brevity, a single RWG block assembly, namely RWG block assembly 130a, will be discussed in order to generally describe the structure of a RWG block assembly in accordance with the embodiments. It should be appreciated that the other RWG block assemblies 130b-130d in the optical connectivity system 100 can have a similar structure as describe with respect to the RWG block assembly 130a. As seen, ribbon fibers 122a are terminated to the parallel-fiber ferrule 120a within RWG block assembly 130a at its distal end (with respect to the arrays of simplex ferrules 180a). The parallel-fiber ferrule 120a can include a row (or multiple rows) of fibers. In detail, the RWG block assembly 130a has a parallel-fiber ferrule interface 119a at its distal end that is configured for receiving the parallel-fiber ferrule 120a (having the ribbon fibers 122a terminated thereto) being inserted into the RWG block assembly 130a. At the opposing end of the RWG block assembly 130a, a group of simplex ferrule interfaces 114a is configured for receiving each of the individual simplex ferrules comprised in the simplex ferrule array 113a that is being inserted at this opposing side. Alternatively, the group of simplex ferrule interfaces 114a and the parallel-fiber ferrule 120a can be coupled via an angled connecter, such as a 90° connector. In this configuration (not shown), the group of simplex ferrule interfaces 114a and the parallel-fiber ferrule 120a can be positioned at different sides of the RWG block assembly 130a with respect to each other (e.g., right angles to each other rather than opposing ends). For example, the group of simplex ferrule interfaces 114a can be arranged at a top surface of the RWG block assembly 130a and the parallel-fiber ferrule 120a at a lateral (or side) surface of the RWG block assembly 130a. There can be a 1:1 relationship between the number of interfaces in the group of simplex ferrule interfaces 114a and the number of simplex ferrules in the simplex ferrule array 113a, such that each simplex ferrule interface can receive a single corresponding simplex ferrule. In the illustrated example, there are 16 simplex ferrules in the simplex ferrule array 113a (each simplex ferrule terminating a fiber cable in a bundle of fiber cables 180a). Accordingly, the RWG block assembly 130a is structured to include 16 interfaces in the group of simplex ferrule interfaces 114a. The RWG block assembly 130a includes a group of fixed waveguides 117a integrated within the block, where each waveguide ultimately forms an optical coupling between a fiber in the parallel-fiber ferrule 120a and a corresponding individual simplex ferrule (in the simplex ferrule array 113a).

A key design feature is that each of the simplex ferrules in the simplex ferrule arrays 113a-113d can be individually installed (and removed) within any of the RWG block assemblies 130a-130d. By allowing all of the simplex ferrules in the shuffle box 115 to be easily repositioned in the RWG block assemblies 130a-130d, the shuffle can be re-configured. In other words, the shuffle function is achieved by installing simplex ferrules (in the simplex ferrule array 113a-113d) in custom-defined positions (as defined by the positions of the simplex ferrule interfaces 114a-114d and the fixed waveguides 117a within the blocks) in each of the RWG block assemblies 130a-130d. As an example of this re-configuring capability, FIG. 1 illustrates a simplex ferrule 113p being repositioned. Specifically, the simplex ferrule 113p can be removed from its original position (e.g., installed in another RWG block assembly) in order to be installed in a different RWG block assembly, shown as RWG block assembly 130d. Due to individually moving a fiber connection of the simplex ferrule 113p (or any of the individual simplex ferrules) the shuffle can be re-configured in a modular manner, without having to reassemble the entire optical connectivity system 100 as required in some traditional fixed-assembled fiber shuffles.

Figure 2A:
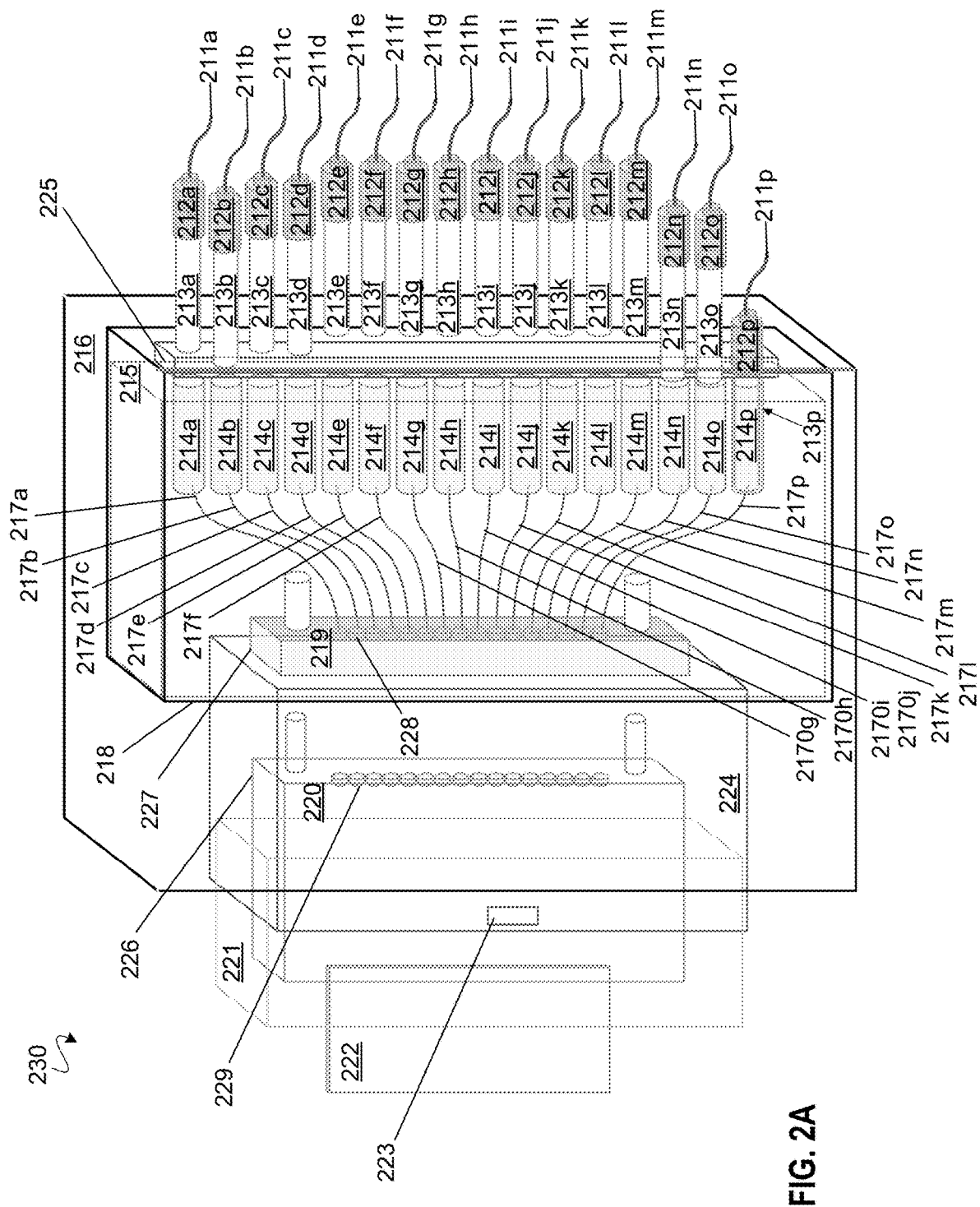
FIG. 2A is an example of a RWG block assembly shown in FIG. 1, according to some embodiments.

FIG. 2A prominently illustrates an example of a RWG block assembly 230. In general, the RWG block assembly 230 includes: a RWG block 215; multiple simplex ferrule interfaces 214a-214p; multiple fixed waveguides 217a-217p; a parallel-fiber ferrule interface 219; and a RWG block housing 216. The RWG block 215 can be described as a rectilinear body that is substantially rectangular in geometry. According to the embodiments, the RWG block 215 is structured from glass. However, the RWG block 215 can be made of other rigid materials, such as plastic. Embedded within the RWG block 215 are fixed waveguides 217a-217p. The fixed waveguides 217a-217p can be laser-written waveguides within the glass block of the RWG block 215, for example. In some embodiments, the RWG block 215 can be constructed using hollow-metal waveguides in a polymer block. In further embodiments, the RWG block 215 can be constructed using traditional off-the-shelf ferrules interconnected with fibers.

On the RWG block 215, the parallel-fiber ferrule interface 219 is installed on a distal end, and the simplex ferrule interfaces 214a-214p is installed on the opposing end. In the example configuration shown in FIG. 2A, there are 16 fixed waveguides 217a-217p. Correspondingly, the RWG block assembly 230 is configured with 16 simplex ferrule interfaces 214a-214p. This allows for each of the fixed waveguides 217a-217p to extend from the parallel-fiber ferrule interface 219, arranged at one end of the RWG block 215, to a corresponding one of the simplex ferrule interfaces 214a-214p. Each connection that the fixed waveguides 217a-217p form between the simplex ferrule interfaces 214a-214p and the parallel-fiber ferrule interface 219 optically couples a defined parallel-fiber ferrule waveguide position to a correspondingly defined simplex ferrule waveguide position within the RWG block 215. That is, once the parallel-fiber ferrule 220 is inserted within the parallel-fiber ferrule interface 219 on the RWG block 215, the row of fibers in the ferule 220 are aligned with the defined positions of the parallel-fiber ferrule interface 219 and coupled to a respective one of the simplex ferrule interfaces 214a-214p via the fixed waveguides 217a-217p.

Each of the simplex ferrule interfaces 214a-214p is structured as a cavity for receiving a ferrule, with the cavity having a bottom surface that may be particularly shaped to accept one of the simplex ferrules 213a-213p. Thus, on one end of a simplex ferrule interface, for instance simplex ferrule interface 214a, the simplex ferrule 213a is inserted. The opposite end of the simplex ferrule interface 214a is interfaced to the complementary fixed waveguide 217a on the RWG block 215. The specific configuration of the simplex ferrule interfaces 214a-214p is described in greater detail with reference to FIGS. 3A-3B.

Referring now to the opposite end of the RWG block assembly 230, FIG. 2A shows the parallel-fiber ferrule 220 positioned for being installed within the parallel-fiber ferrule interface 219 on the RWG block 215. As alluded to above, the parallel-fiber ferrule interface 219 is a receptacle structure that is configured to accept a parallel ferrule, namely parallel-fiber ferrule 220. As seen, the parallel-fiber ferrule interface 219 can have a configuration as a receptacle where its cavities 227 (e.g., female) have complementary shapes and dimensions for receiving the extensions 226 (e.g., male) of the parallel-fiber ferrule 220. The parallel-fiber ferrule 220 may have fibers 229 protruding of the extension 226. The parallel-fiber ferrule interface 219 may have a row of lenses 228. Each lens 228 on the row inside of the parallel-fiber ferrule interface 219 is structured for coupling optical signal of a fiber 229 when the parallel-fiber ferrule 220 is fully installed inside on the interface 219 (not shown). Furthermore, each lens 228 in the parallel-fiber ferrule interface 219 is coupled to a single fixed waveguide 217a-217p, thereby coupling a defined position in the parallel-fiber ferrule interface 219 to a corresponding simplex ferrule interface 214a-214p on the distal end of the RWG block 215.

The parallel-fiber ferrule 220 can be supported within a parallel-fiber ferrule housing 221, and ribbon fibers 222 can be terminated on the parallel-fiber ferrule 220. Similarly, the RWG block 215 can be supported within a RWG block housing 216. The RWG block housing 216 can be generally described as a well to accept, or house, the RWG block 215. The illustrated example also shows that the RWG block housing 216 can be fitted with an alignment and retention area 224, which is configured to stably accept, retain and properly align when installing the parallel-fiber ferrule housing 221 within the RWG block 215. The alignment and retention area 224 can include features that interact with retention features 223 for the parallel-fiber ferrule housing 221 in order to properly retain the housing 221, thereby aligning the parallel-fiber ferrule 220 with the parallel-fiber ferrule interface 219 in the RWG block assembly 230. For example, proper alignment ensures that each fiber in the row within the parallel-fiber ferrule 220 is horizontally aligned with the corresponding predefined position (e.g., row of lenses) in the parallel-fiber ferrule interface 219. The RWG block housing 216 can also include a simplex ferrule retention area 225 to accept and stably retain the plurality of simplex ferrules 213a-213p. Generally, the simplex ferrule retention area 225 is on the opposite end of the RWG block housing 216 from the parallel-fiber ferrule alignment and retention area 224. Although the RWG block housing is shown to house a single RWG block 215, it should be appreciated that in some embodiments the RWG block housing 216 may be configured to hold multiple RWG blocks.

With the RWG block assembly 230 being configured with a certain number of predefined positions (corresponding to the fixed waveguides 217a-217p and the simplex ferrule interfaces 214a-214p) the RWG block assembly 230 is able to receive up to the same number of fiber connections. In the exemplary configuration, there are 16 fiber waveguides 211a-211p that are coupled to the RWG block assembly 230 (via the simplex ferrule interfaces 214a-214p) at its distal end. Simplex ferrule holders 212a-212p are supportive structures for stably holding and retaining the simplex ferrules 213a-213p in position, for instance when inserting the simplex ferrules 213a-213p into simplex ferrule interfaces 214a-214p. Each of the simplex ferrule holders 212a-212p are configured to individually house a corresponding simplex ferrule 213a-213p (having the fiber waveguides 211a-211p terminated thereto). Thus, the fiber waveguides 211a-211p can be coupled to the RWG block assembly 230 by mating the simplex ferrules 213a-213p within the simplex ferrule interfaces 214a-214p (where mating is supported by retention features on the simplex ferrule interfaces 214a-214p interacting with the simplex ferrule holders 212a-212p). Configurations for the simplex ferrules 214a-214p and simplex ferrule holders 212a-212p are described in greater detail with reference to FIGS. 3A-3B.

FIG. 2A illustrates 16 simplex ferrules 213a-213p that are aligned to be individually inserted into a corresponding simplex ferrule interface 214a-214p on the RWG block 215. Particularly, simplex ferrule 213p is shown in a fully inserted position, being inside of the cavity of the simplex ferrule interface 214p.

As seen, the RWG block assembly 230 is arranged such that: fixed waveguide 217a routed between parallel-fiber ferrule interface 219 and simplex ferrule interface 214a receiving simplex ferrule 213a; fixed waveguide 217b routed between parallel-fiber ferrule interface 219 and simplex ferrule interface 214b receiving simplex ferrule 213b; fixed waveguide 217c routed between parallel-fiber ferrule interface 219 and simplex ferrule interface 214c receiving simplex ferrule 213c; fixed waveguide 217d routed between parallel-fiber ferrule interface 219 and simplex ferrule interface 214d receiving simplex ferrule 2134d; fixed waveguide 217e routed between parallel-fiber ferrule interface 219 and simplex ferrule interface 214e receiving simplex ferrule 213e; fixed waveguide 217f routed between parallel-fiber ferrule interface 219 and simplex ferrule interface 214f receiving simplex ferrule 213f; fixed waveguide 217g routed between parallel-fiber ferrule interface 219 and simplex ferrule interface 214g receiving simplex ferrule 213g; fixed waveguide 217h routed between parallel-fiber ferrule interface 219 and simplex ferrule interface 214h receiving simplex ferrule 213h; fixed waveguide 217i routed between parallel-fiber ferrule interface 219 and simplex ferrule interface 214i receiving simplex ferrule 213i; fixed waveguide 217j routed between parallel-fiber ferrule interface 219 and simplex ferrule interface 214j receiving simplex ferrule 213j; fixed waveguide 217k routed between parallel-fiber ferrule interface 219 and simplex ferrule interface 214k receiving simplex ferrule 213k; fixed waveguide 217l routed between parallel-fiber ferrule interface 219 and simplex ferrule interface 214l receiving simplex ferrule 213l; fixed waveguide 217m routed between parallel-fiber ferrule interface 219 and simplex ferrule interface 214m receiving 213m; fixed waveguide 217n routed between parallel-fiber ferrule interface 219 and simplex ferrule interface 214n receiving simplex ferrule 213n; fixed waveguide 217o routed between parallel-fiber ferrule interface 219 and simplex ferrule interface 214o receiving simplex ferrule 2130; and fixed waveguide 217p routed between parallel-fiber ferrule interface 219 and simplex ferrule interface 214p receiving simplex ferrule 213p. In this example, the parallel-fiber ferrule 221 is ribbonized-run to the RWG block 125, and then fan-out to the RWG blocks' 214 simplex ferrule interfaces 214a-214p to create a pre-configured fiber shuffle, containing complex shuffle locally around a RWG block housing 216.

Figure 2B:
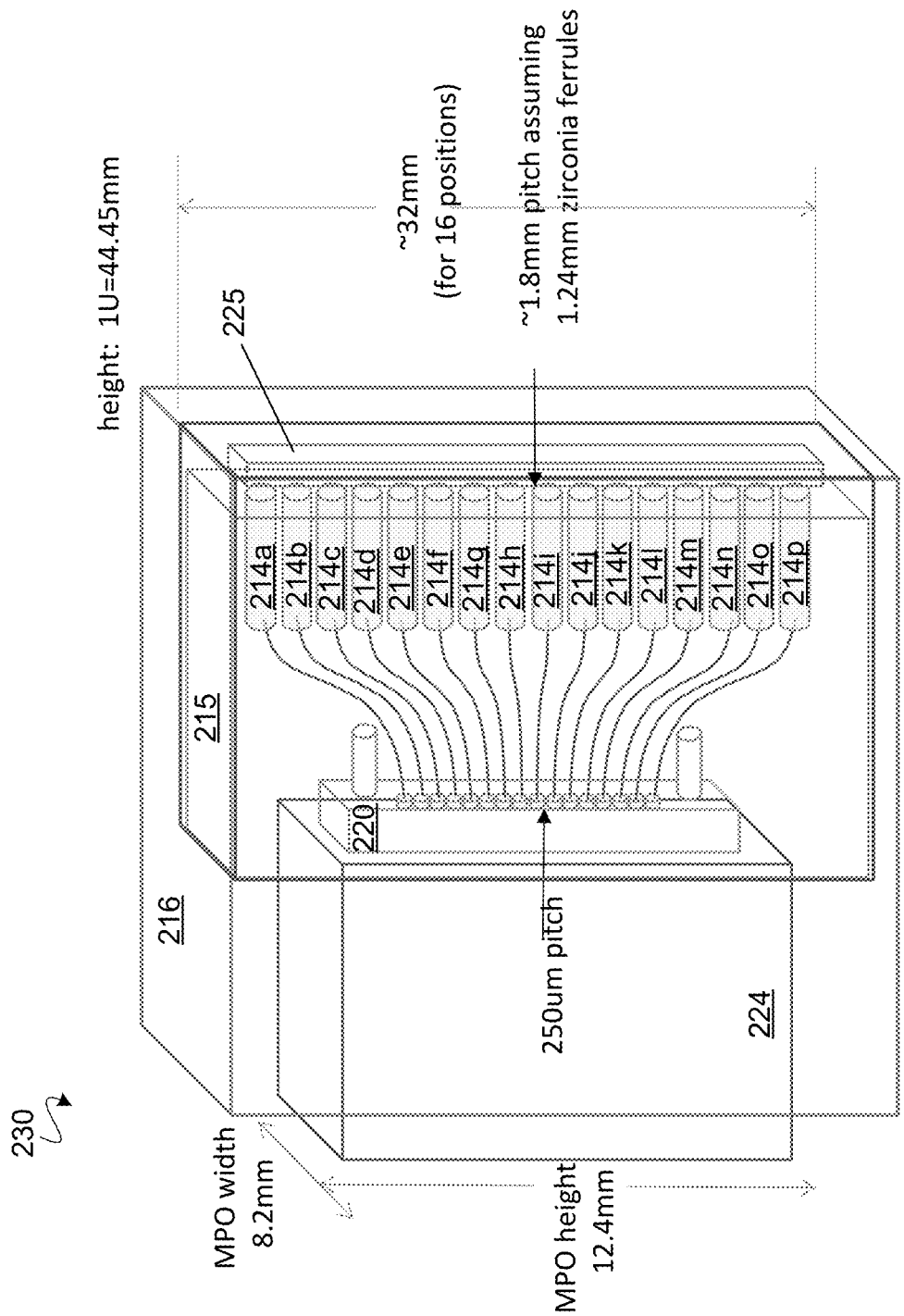
FIG. 2B is an example a RWG block assembly shown in FIG. 2A including examples of structural dimensions, according to some embodiments.

Referring now to FIG. 2B, an example of an RWG block assembly 230 including approximate dimensions for its elements described above (in reference to FIG. 2A) is illustrated. FIG. 2B shows a substantially similar structure and function of the RWG block assembly 230 previously discussed in FIG. 2A above. Thus, for purposes of brevity, structures and functions that are the same as previously described are not discussed in details again in reference to FIG. 2B. As an example, the shown dimensions may be used in an implementation of the RWG block assembly 230 specifically structured for receiving a conventional multi-fiber push on (MPO) connector (with MT ferrules inside). The shown parallel-fiber ferrule 220, which is a standard MPO in this example, can have dimensions used with most standard MPOs. In order to account for the size and dimensions of the MPO, the section of the RGW block assembly 230 that is particularly structured for accepting the MPO, namely the parallel-fiber ferrule alignment and retention area 224 can have dimension that are commensurate with the MPO connector (or parallel-fiber ferrule housing) including: 8.2 mm width; 12.4 mm height; and 250 μm pitch between fibers.

According to the embodiments, a thickness (e.g., width) of the RWG block 215 supports the dimensions of the MT ferrule and simplex ferrules, as opposed to being structured for dimensions of the MPO connector. In the illustrated example, the RWG block 215 has a height that is approximately 32 mm (for 16 positions), a width that is approximately 11.5 to 15 mm, and the pitch between simplex ferrule interfaces 214a-214p that is approximately 1.8 mm (e.g., for 1.24 mm zirconia ferrules). The height of the entire RWG block assembly 230 may be limited by a height of the optical system. In other words, the RWG block assembly 230 may be structured to have a height that stays within a rack unit (measurement of the overall height of rack frames) of 1U (which is approximately 44.45 mm). In an alternate embodiment, the height of the RWG block assembly 230 can be reduced by implementing a 2×8 array of simplex ferrule interfaces 214a-214p and fixed waveguides 217a-217p to replace the single row of 16 simplex ferrule interfaces 214a-214p shown in FIG. 2B. It is important to note that dimensions discussed with respect to FIG. 2B are not intended to be limiting, and different dimensions (e.g., smaller) may result using emerging compact ferrules, such as USConec MDC and Senko SN.

In FIG. 3A, an example of a simplex ferrule 313 and a simplex ferrule interface 314 that can be used in the RWG block assembly (shown in FIG. 2A) is depicted. In other words, FIG. 3A prominently shows an individual simplex ferrule 313 that can be comprised in the plurality of simplex ferrules of the RWG block assembly (shown in FIG. 2A) and an individual simplex ferrule interface 314 that can be comprised in the plurality of simplex ferrule interfaces of the RWG block assembly (shown in FIG. 2A). The simplex ferrule 313 and simplex ferrule interface 314, as disclosed herein, are uniquely structured to realize a low-loss connection in the optical coupling accomplished via the RWG block assembly.

As previously described, the simplex ferrule 313 can be implemented as a zirconia or stainless steel ferrule. Generally, a ferrule is a part of a fiber-optic plug that holds the end of the optical fiber to precisely align it to a socket. The simplex ferrule 313 can have a flange 301 on an end, and an end-face 305 on the opposite end, where the end of the optical fiber is exposed for coupling. To revisit, the simplex ferrule interface 313 is a receptacle structure having a cavity 331 that can accept the length of the simplex ferrule 313 when inserted therein. Once the simplex ferrule 313 is installed in the simplex ferrule interface 314, the fiber core 303 (inside of the simplex ferule 313) is coupled to a fixed waveguide 323 of the RWG block assembly. The simplex ferrule 313 is shown to have a flange 301 having a fiber waveguide 311 terminated thereto. The flange 301 can have a retention feature 302 to engage within a retention area of the RWG block housing 316 (shown in FIG. 3B).

As shown, the simplex ferrule 313 is designed with a radial-orientation feature 302. The radial-orientation feature 302 can be employed to support self-alignment of the simplex ferrule 313 when it is installed inside of the simplex ferrule interface 314. In the example, the radial-orientation feature 302 is structured as a protruding tab extending from the external surface of the flange 301. The radial-orientation feature 302 is designed to interact with a complimentary retaining feature on the RWG block housing such that the simplex ferrule 313 is surely retained and aligned within the simplex ferrule interface 314. This interaction between the radial-orientation feature 302 and the RWG block housing is shown in greater detail in FIG. 3B. It should be appreciated that the example structure shown for the radial-orientation feature 302 illustrated in FIG. 3A is not intended to be limited, and other types of alignment and/or latching mechanisms can be used to implement the radial-orientation feature 302, as deemed appropriate. According to the embodiments, the simplex ferrule 313 can radially self-align either per the ferrule key (shown in FIGS. 4A-4C), and/or the particularly shaped end-face 305 of the simplex ferrule 313 mating with a complementarily shaped cavity end-face 334 of the simplex ferrule interface 314. This mating between the simplex ferrule 313 and the simplex ferrule interface 314 is also shown in greater detail FIG. 3B.

Additionally, the simplex ferrule 313 can have another alignment mechanism, shown as alignment groove 306. This alignment groove 306 can be a slightly dented (or recessed) portion of the simplex ferrule's 313 external surface. The alignment groove 306 can run the length of the simplex ferrule 313 (e.g., extending from the end-face 305 to the flange 301), being positioned at the top of the simplex ferrule's 313 external surface. The alignment groove 306 on the simplex ferrule 313 has a complimentary mechanism on the simplex ferrule interface 314 to accomplish alignment, namely the alignment feature 322 on the simplex ferrule interface 314. The alignment feature 322 is configured as a protruding portion in the cavity 331 of the simplex ferrule interface 314 to be received inside of the open space of the alignment groove 306, when the simplex ferrule 313 is properly aligned and inserted therein. The alignment feature 322 can be described as a ridge (e.g., sloped edges) extending from an internal surface of the cavity 331. This alignment feature 322 protrudes outward, which allows the simplex ferrule 313 to be radially oriented for the alignment feature 322 to slide through the inward opening of the alignment groove 306. By aligning the alignment feature 322 to be accepted by the alignment groove 306, the simplex ferrule 313 is radially oriented (and properly aligned) while being inserted inside the cavity 331 of the simplex ferrule interface 314. In FIG. 3A, it shows the simplex ferrule 313 arranged in a proper position to be accepted by the simplex ferrule interface 314. Specifically, the simplex ferrule 313 is positioned to have its shaped end-face 305 facing towards the opening of the cavity 331 of the simplex ferrule interface 314, and the alignment groove 306 situated at the top to be horizontally aligned with the complimentary alignment feature 322, which is also situated at the top of the simplex ferrule interface 314. Further, the simplex ferrule 313 is aligned such that the fiber core 303 is horizontally aligned with the fixed waveguide 323 (with complementary shaped end-face at the end of the simplex ferrule interface 314) for low-loss connection when optically coupled between shaped end-faces. The shaped end-face of the simplex ferrule 313 may be formed by polishing the simplex ferrule 313 after the core 303 of a fiber 311 is installed within the simplex ferrule 313. The shaped end-face of the fixed waveguide 323 may be fabricated when the RWG block assembly is manufactured. Again, an example of the simplex ferrule 313 fully installed inside of the simplex ferrule interface 314, showing where the alignment groove 306 on the simplex ferrule 313 accepts the alignment feature 322 on the simplex ferrule interface 314 is illustrated in detail in FIG. 3B.

In addition, as alluded to above, the simplex ferrule 313 can have a shaped end-face 305. Particularly in FIG. 3A, the end-face 305 of the simplex ferrule 313 is angled. Ferrules having angled end-faces, such as angle-polished ferrules, can minimize reflection losses. In most cases, larger reflections typically cause poorer connections in optical fiber links. Further, in order to optimize the mechanically coupling between the simplex ferrule 313 (having the shaped end-face 305) and the simplex ferrule interface 314, the cavity 331 of the simplex ferrule interface 314 is similarly configured with a complimentary shaped end-face 334. In the illustrated example, the end-face 334 of the simplex ferrule interface 314 is angled inward (e.g., slanted left), which compliments the angled end-face of the simplex ferrule 313 which is also angled inward (e.g., slanted left).

FIG. 3B serves to illustrate the simplex ferrule 313 fully inserted into the simplex ferrule interface 314. FIG. 3B shows a substantially similar structure and function of simplex ferrule 313 and the simplex ferrule interface 314 as previously discussed in FIG. 3A above. Thus, for purposes of brevity, structures and functions that are the same as previously described are not discussed in details again in reference to FIG. 3B. With the simplex ferrule interface 314 accepted in the simplex ferrule 313, the alignment groove 306 on the simplex ferrule 313 as received by the alignment feature 322 on the simplex ferrule interface 314 can be seen. Also, this configuration shows an example of the radial-orientation feature 302 of the simplex ferrule 313 engaging with a complimentary retention and alignment feature 362 on a ferrule holder 312. As seen, the tab, namely the radial-orientation feature 302 extends upwards through a hole, namely the alignment feature 362 on the simplex ferrule holder 312. As previously described, the simplex ferrule 313 can be radially self-aligned, where the simplex ferrule 313 can be considered as properly aligned within the simplex ferrule interface 314 in the position where the radial-orientation feature 302 is engaged with the alignment feature 362. Also seen, the simplex ferrule holder 312 supports a flange spring 336 to provide positive mating pressure for the simplex ferrule 313 and its flange 301 to be mated within the cavity 331 of the simplex ferrule interface 314, while being latched within a retention area of the RWG block housing. According to the embodiments, the RWG block housing (shown in FIG. 2A) has a retention area that also provides alignment for the simplex ferrule holder 312 and to hold against the flange spring 336. Moreover, FIG. 3B illustrates how the end-face 305 of the simplex ferrule 313 fits against the end-face 334 of the cavity 331 (when the simplex ferrule 313 mates with the simplex ferrule interface 314) in a full mechanical coupling, as both end-faces 305, 334 have the same angled shape with similar dimensions. The end-face 305 of the simple ferrule 313 mating with the complimentary shaped end-face 334 of the cavity 331 is a key aspect in realizing the self-alignment and low connection loss features of the disclosed embodiments. Elements and features of the simplex ferrule 313 and the simplex ferrule holder 312 are described in greater detail in reference with FIGS. 6A-6G.

Figure 4C:
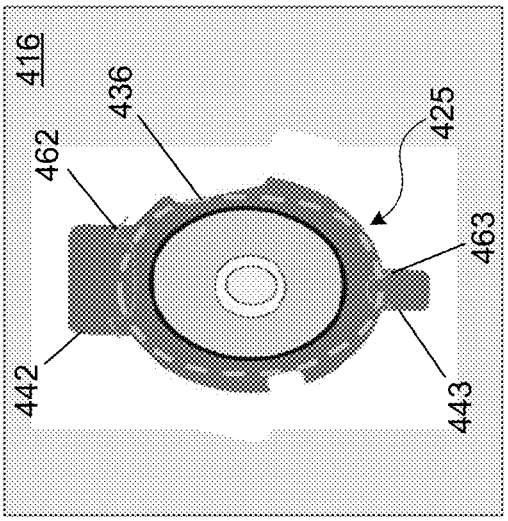
FIG. 4C depicts the simplex ferrule holder fully installed in the RWG block housing shown in FIG. 4A, according to some embodiments.
Figure 4B:
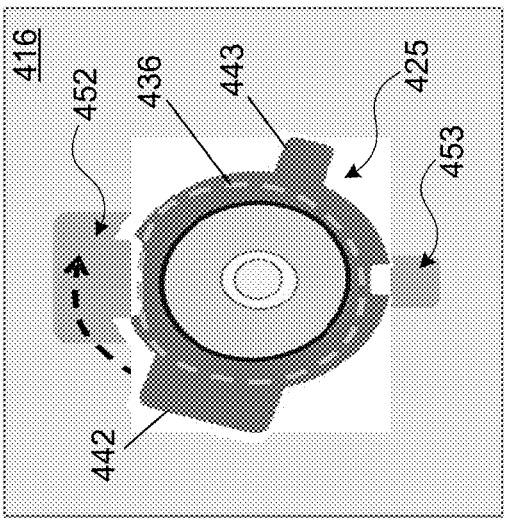
FIG. 4B depicts the simplex ferrule holder partially installed in the RWG block housing shown in FIG. 4A, according to some embodiments.
Figure 4A:
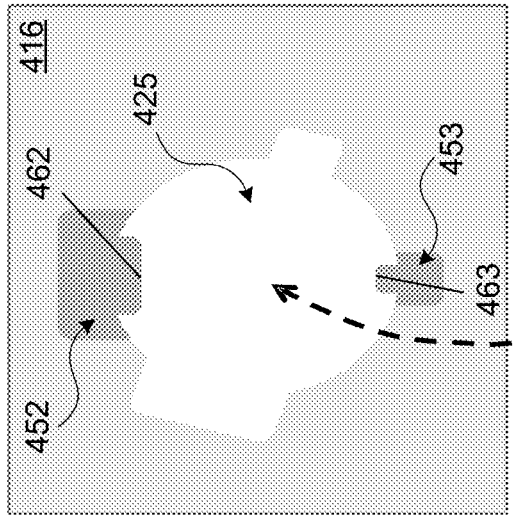
FIG. 4A depicts a simplex ferrule holder prior to being installed in a RWG block housing as implemented in the RWG block assembly of FIG. 2A, according to some embodiments.
Figure 4A:
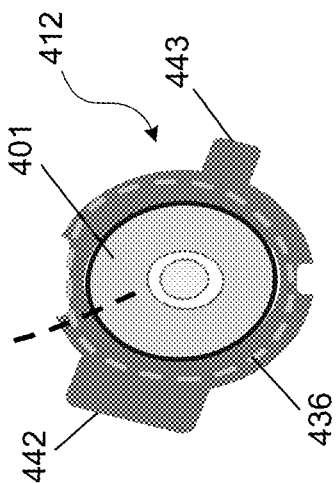

FIGS. 4A-4B illustrate multiple examples of positions that can be involved in installing a simplex ferrule holder 412 within a simplex ferrule retention area 435 in the RWG block housing 416 according to the disclosed embodiments. As previously described, the disclosed RWG block assembly can include a uniquely designed RWG block housing 416. The RWG block housing 416 can be described as a mechanical structure for accepting and stably housing one or more glass blocks of the assembly. The RWG block housing 416 is also configured to include multiple alignment and retention features for stably installing the parallel-fiber ferrule housing on one end, and on the distal end stably installing a plurality of simplex ferrule holders, such as simplex ferrule holder 412 which is shown and described in FIGS. 4A-4C. Specifically, FIGS. 4A-4C show a respective front view, including a square to represent a particular section of the RWG block housing 416 (as opposed to the entire housing), for instance within the simplex ferrule retention area, that is employed for installing the individual simplex ferrule holder 412. Particularly, FIG. 4A depicts the simplex ferrule holder 412 prior to being installed in the RWG block housing 416. The example shows an opening 425 in the RWG block housing 416, where the opening 425 is configured to accept the simple ferrule holder 412 (and the simplex ferrule installed therein). FIG. 4A includes a dashed arrow representing how the simplex ferrule housing 412 should be moved from its shown position to be aligned for inserting through the opening 425 and installing in the RWG block housing 416. As alluded to above, the opening 425 can be particularly positioned in the simplex ferrule retention area of the RWG block housing 416. The flange 401 of the simplex ferrule is also shown. The flange 401 can be described as a rim piece (or collar) that can be placed on the simplex ferrule serving to strengthen (more rigid) or for attachment. As seen, the flange 401 can be installed inside of the simplex ferrule holder 412. Further, a spring 436 can be placed around the flange 401 and also installed within the simplex ferrule holder 412. The flange 401 and the spring 436 are dimensioned (e.g., smaller diameter as compared to the simplex ferrule holder 412) to clear and go through the opening 425, when the simplex ferrule is fully installed in the RWG block (via the simplex ferrule interface). Ultimately, the spring 435 and the flange 401 of the simplex ferrule exit on the opposite side of the housing 416 (not shown) where the simplex ferrule interface is positioned. The simplex ferrule holder 412 is dimensioned (e.g., larger diameter as compared to the flange 401) to not clear the opening 425, therefore remaining on the exterior side of the RWG block housing 416 that is shown in FIG. 4A.

In addition, retention and alignment features of the RWG block housing 416 are shown. Particularly, the illustrated retention and alignment features of the RWG block housing 416 are: an upper ledge 462, and a lower ledge 463 for seating the latching tabs 442 and 443 of the simplex ferrule holder, respectively; and an upper recessed area 452, and a lower recessed area 453 for receiving the latching tabs 442 and 443 of the simplex ferrule holder 412, respectively. The latching tab 442 is depicted as being substantially larger (e.g., width and height) than the other latching tab 443 on the simplex ferrule holder 412. In order to accommodate the respective sizes of the latching tabs 442, 443, the upper ledge 462 and the upper recessed area 452 (structured to be complimentary to the larger latching tab 442) are generally larger than the lower ledge 463 and the lower recessed area 453 (structured to be complimentary to the smaller latching tab 443). The latching tabs 442, 443 of the simplex ferrule holder 412 are particularly shaped to allow for proper radial orientation of the simplex ferrule.

Referring now to FIG. 4B, an example of a position where the simplex ferrule is partially installed in the RWG block housing 416 is shown. FIG. 4B shows a substantially similar structure and function of the simplex ferrule holder 412 and the RWG block housing 416 as previously discussed in FIG. 4A above. Thus, for purposes of brevity, structures and functions that are the same as previously described are not discussed in details again in reference to FIG. 4B. However, in this position of FIG. 4B, the simplex ferrule housing 412 is inserted though the opening 425. This position for the simplex ferrule holder 412 is described as partially installed in the RWG block housing 415, as the holder 412 is not yet oriented to be fully engaged with the retention and alignment features of the RWG block housing 416. That is, the simplex ferrule holder 412 is not positioned such that its latching tab 442 is aligned with the upper recessed area 452 and the upper ledge 462; and the latching tab 443 is aligned with the lower recessed area 453 and the lower ledge 463. FIG. 4A includes a dashed arrow representing that the simplex ferrule housing 412 can be rotated clockwise from its shown position for the latching tabs 442, 443 to engage the retention and alignment features and fully install the holder 412 (and the simplex ferrule installed therein) in the RWG block housing 412.

FIG. 4C depicts an example of a position where the simplex ferrule is fully installed in the RWG block housing 416. FIG. 4C shows a substantially similar structure and function of the simplex ferrule holder 412 and the RWG block housing 416 as previously discussed in FIG. 4A above. Thus, for purposes of brevity, structures and functions that are the same as previously described are not discussed in details again in reference to FIG. 4C. In detail, FIG. 4C shows the simplex ferrule holder 412 oriented such that it is fully engaging the retention and alignment features of the RWG block housing 416. As seen, the simplex ferrule holder 412 is positioned such that the latching tab 442 rests within the upper recessed area 452, and the spring 462 sits in the upper ledge 462. Further, the latching tab 443 is resting within the lower recessed area 453, the spring 463 sits in the lower ledge 463. When the simplex ferrule holder 412 is fully installed in the RWG block housing 416, the simplex ferrule can be considered to have the proper radial orientation for mechanical installation in the simplex ferrule interface and optical coupling to a corresponding fixed waveguide in the RWG block assembly.

FIG. 5A depicts a perspective view of an example configuration for a RWG block housing 516 with a carrier bracket 555 installed thereon. The RWG block housing 516 accepts and stably retains one or more RWG blocks, and has been previously described in detail throughout the disclosure. The carrier bracket 555 is a structure that is configured to connect on to the RWG block housing 516. Accordingly, the carrier bracket 555 is shown to be connected to the RWG block housing 516 in this example. With this modularity, a larger block can be formed that consists of the carrier bracket 555 and the RWG block housing 516.

The carrier bracket 555 can be described as a rigid structure having a primarily rectangularly shaped body, including apertures 551a-551p along an exterior surface to receive an array of simplex ferrules to be installed in a RWG block that is in the RWG block housing 516. In this example, the carrier bracket 555 is configured with the apertures 551a-551p arranged as a 2×8 array, which allows for up to a total of 16 simplex ferrules to be installed. As seen, each of the apertures 551a-551p have a shape that is similar to the profile of the simplex ferrule holder (shown in FIG. 4A) having a primarily circular shape with two extended sections (complimentary to the latching tabs of the simplex ferrule holder). This shape, intended to be complimentary to design of the simplex ferrule holder, allows the apertures 511a-511p to receive the simplex ferrule holder. In other words, simplex ferrules in their holders, can be installed directly in the carrier bracket 555. For example, FIG. 5A shows a single simplex ferrule holder 512 (with simplex ferrule 513 installed there) installed in the carrier bracket 555, as the carrier bracket 555 is connected to the RWG block housing 516. Specifically, the ferrule holder 512 is inserted in aperture 551p. With the carrier bracket 555 fully attached to the RWG block housing 516 as shown, the simplex ferrule 513 is positioned properly to be fully inserted into the simplex ferrule interface within the RWG block, forming the optical coupling with the fixed waveguide. This serves to illustrate a key feature of the disclosed RWG block assembly, where each of the simplex ferrules can be individually installed in a manner that allows reconfiguration of the fiber connections in the fiber shuffle.

FIG. 5B depicts another perspective view of the RWG block housing 516 with the carrier bracket 555 connected thereto. This example demonstrates both sides of coupling to the RWG block housing 516, namely the simplex ferrules installed on the distal end of the RWG block housing 516 (via the carrier bracket 555) and the parallel-fiber ferrule connector 540 installed on the opposite end of the RWG block housing 516. FIG. 5B shows all of the apertures (shown in FIG. 5A) on the carrier bracket 555 having an individual simplex ferrule holder 512a-512p (having a simplex ferrule installed therein) installed inside, respectively. The parallel-fiber ferrule connector 540 shown as a standard MPO connector, can house the parallel-fiber ferrule 520. As discussed, the RWG block assembly has a distinct design that allows for compatibility with many off the shelf connectors employed in industry, such as MPOs. By installing the parallel-fiber ferrule connector 540540 through a receptacle in the RWG block housing 516 (shown in FIG. 5E), the parallel-fiber ferrule 520 is then connected to the RWG block (inside of the RWG block housing 516) in a manner that optically couples each of the fibers of the parallel-fiber ferrule 520 to a corresponding fixed waveguide of the RWG block assembly. As a result, in this configuration, the simplex ferrules (installed via the simplex ferrule holders 512a-512p) are coupled to the fixed waveguides inside of the RWG block with the carrier bracket 555 connected to the RWG block housing 516. Also, once the parallel-fiber ferrule connector 540 is fully installed in the RWG block housing 516 from its shown position, then the parallel-fiber ferrule 520 will be coupled (via the parallel-fiber ferrule interface) to the other end of the fixed waveguides inside of the RWG block.

FIG. 5C depicts an example configuration of the RWG block housing 516 and the carrier bracket 555 separated from each other, and being positioned for coupling. As shown, the carrier bracket 555 has the simplex ferrule holders 512a-512p already installed thereon, prior to being attached to the RWG block housing 516. As shown, there are openings 525a-525p in the RWG block housing 516 that are arranged in a similar 2×8 array formation as the apertures on the carrier bracket 555. The RWG block 515 is installed inside of the RWG block housing 516, such that the openings 525a-525p along the front surface of the RWG block 515 are aligned with the positions of the simplex ferrules installed in the carrier bracket 555. Restated, the carrier bracket 555 is particularly dimensioned to have the simplex ferrules situated at fixed distances from each other, or defined position, when installed, that is the same as the positions of the openings 525a-525p in the RWG block 515. To this end, the simplex ferrules that are installed and extend outward from the carrier bracket 555 (shown in the example as simplex ferrules 513b, 513d, 513f, 513h, 513n) can be received in the openings 525a-525p (when attaching the carrier bracket 555 to the RWG block housing 516), and further inserted into the simplex ferrule interfaces on the RWG block 515 when then RWG block housing 516 is connected to the carrier bracket 555.

The perspective view in FIG. 5C shows attachment features 552a-552c on the carrier bracket 555 that enable it to be securely connected to the RWG block housing 516. The attachment features 552a-552c are shown as elongated tabs that extend from a lateral surface on the side of the carrier bracket 555, having a hook at the distal end of each tab. Although not show, additional attachment features can similarly extend from the other side of the carrier bracket 555. The RWG block housing 516 has attachment features 553a-553c that are structured to be complimentary to the attachment features 552a-552c of the carrier bracket 555. The attachment features 553a-553c on the RWG block 516 can be described as grooves that slidably receive the tabs of the 552a-552c, and a notch, or an opening, that the hook at the end of the attachment features 552a-552c can lock into. By moving the carrier bracket 555 from its shown position towards a coupling end of the RWG block housing 516, with continued applied force in that direction, the tabs of the attachment features 552a-552c will be received and slide through the grooves of the attachment features 553a-553c. Continuing with the coupling force, the simplex ferrules 513a-513b will be inserted into the openings 525a-525p in the RWG block 515. When the carrier bracket 555 and the RWG block housing 516 come into contact, a back surface of the carrier bracket 555 can push against a front surface of the RWG block housing 516 ensuring that the two parts are fully connected to each other. At this point, the hooks at the end of the attachment features 552a-552c can hook into the notches of the attachment features 553a-553c, securely locking the carrier bracket 555 into this fully attached position with the RWG block housing 516.

Referring now to FIG. 5D, a configuration is shown with the RWG block housing 516 attached to the carrier bracket 555. Further, the parallel-fiber ferrule connector 540 is shown to be fully inserted into the RWG block housing 516. Consequently, in this configuration of FIG. 5D, the parallel-fiber ferrule (which is plugged-in via the connector 540) is optically coupled to the fixed waveguides inside of the RWG block. In addition, the simplex ferrules that are installed in the carrier bracket 555 (connected to the RWG block housing 516), are also optically coupled to the opposite end of the fixed waveguides inside of the RWG block. This forms an optical coupling between the fiber waveguides terminated on the simplex ferrules and a ribbon cable terminated on the parallel-fiber ferrule vis-à-vis the RWG block that is installed inside of the RWG block housing 516, as disclosed.

FIG. 5E shows another perspective view of the RWG block housing 516 attached to the carrier bracket 555. In this view, a lateral surface of the RWG block housing 516 located on the side for installing the parallel-fiber ferrule (shown in FIG. 5D) is prominently shown. This surface include a parallel-fiber ferrule receptacle 535. As illustrated, the parallel-fiber ferrule receptacle 535 is an opening in the surface of the RWG block housing specifically structured to receive and retain the parallel-fiber ferrule. By inserting the parallel-fiber ferrule inside of the parallel-fiber ferrule receptacle 535, the ferrule is stably held inside of the RWG block housing 516 which allows it to be coupled to the parallel-fiber ferrule interface (not shown) within the RWG block. Also, FIG. 5E prominently shows a lateral surface of the carrier bracket 555 having the simplex ferrule holder 512a-512p fully installed therein. For instance, in this configuration, the fully installed simplex ferrule holders 512a-512p are radially self-aligned by rotating the holders 512a-512p, having their holder latching tabs keyed to recessed areas of the carrier bracket 555. Accordingly, the simplex ferrule holders 512a-512p are stably retained in the carrier bracket 555. Installation of the simplex ferrule holders 512a-512p in the carrier bracket 555 is described in greater detail in reference to FIG. 5J, for example. Also, the lateral surface including the simplex ferrules 513a-512p is on the opposite side from the lateral surface (on the RWG block housing 516) having the parallel-fiber ferrule receptacle 535. This example configuration serves to illustrate that the carrier bracket 555, having the simplex ferrule holders 512a-512p installed, can be attached to the RWG block housing 516 before the parallel-fiber ferrule is inserted in the parallel-fiber ferrule receptacle 535.

Referring now to FIG. 5F another perspective view of the carrier bracket 555 attached to the RWG block housing 516 is shown. Again, the simplex ferrule holders 512a-512p are shown to be inserted inside of the carrier bracket 555.

In FIG. 5G, an example of a configuration is shown where the carrier bracket 555 is separated from the RWG block housing 516. This configuration is similar to that shown in FIG. 5C, however in FIG. 5G there are no simple ferrule holders installed of the carrier bracket 555. As seen, the empty carrier bracket 555 is aligned to be attached to the RWG block housing 516. That is, this configuration illustrates that the carrier bracket 555 can be connected to the RWG block housing 516 prior to installing the simplex ferrule holders (not shown), in an embodiment.

FIG. 5H shows an example configuration where the empty carrier bracket 555 is now attached to the RWG block housing 516. In this illustrated example, a single simplex ferrule holder 512p retaining the simplex ferrule 513p is shown. Specifically, the simplex ferrule 513p is shown positioned for installing in an aperture 551p of the carrier bracket 555. For example, the simplex ferrule holder 512p can have its latching tabs aligned with notches in the aperture 551, so that the tabs slide into the notches to latch into place, when the simplex ferrule holder 512p is inserted. The structure of the simplex ferrule holder, such as simplex ferrule holder 512 (including its alignment and retaining features), is described in greater detail in reference to FIG. 6A. As alluded to above, FIG. 5H also shows that the carrier bracket 555 can be attached to the RWG block housing 516 prior to installing the simplex ferrule holders 512p (having simplex ferrule 513p installed therein).

FIG. 5I shows an example of the RWG block housing 516 prior to installing the RWG block 515 therein. As seen, the RWG block 515 is outside of the RWG block housing 516, and aligned such that it can be placed inside of the housing 516. For example, the RWG block 515 can be slidably received by the RWG block housing 516 such that the housing 516 surrounds the volume of the RWG block 515. The surface of the RWG block 515 that includes the opening 525a-525p for installing simplex ferrules (not shown) remains exposed (e.g., not covered by the RWG block housing 516) in order for simplex ferrules to be inserted therein. The example also shows that each of the openings 525a-525p lead to a corresponding simplex ferrule interfaces 514a-514p within the RWG block 515. Accordingly, once the carrier bracket (not shown) is coupled to this surface of the RWG block housing 516, installing a simplex ferrule into the carrier bracket (shown in FIG. 5H) further aligns the simplex ferrule so it can be inserted through the openings 525a-525p. In other words, the carrier bracket aligns the simplex ferrule to be installed into a cavity of one of the simplex ferrule interfaces 514a-514p that are inside of the RWG block 515. FIG. 5I also illustrates that the parallel-fiber ferrule interface 519 is positioned at the opposite end of the RWG block 515, thereby being proximate to the parallel-fiber ferrule receptacle (shown in FIG. 5E) of the RWG block housing 516.

Referring now to FIG. 5J, a surface of the carrier bracket 555 having a simplex ferrule holder 512p partially installed is shown. In this example, the simplex ferrule holder 512p is shown to be inserted into carrier bracket and positioned horizontally. Thus, the latching tabs 563a, 563b are aligned with the aperture 551p and can pass through the carrier bracket 555. In this configuration, the simplex ferrule holder 512p may be rotated (indicated by the counterclockwise arrow) from the shown position in order to be fully locked into the carrier bracket 555. That is, once the simplex ferrule holder 512p is rotated, as shown in FIG. 5K, the latching tabs 563a, 563b will no longer be aligned to the aperture 551p. The latching tabs 563a, 563b of the simplex ferrule holder 512p are now positioned behind the inner wall of the carrier bracket 555, thereby allowing the holder 512p to latch to the carrier bracket 555. Thus, the simplex ferrule holder 512p (and the simplex ferrule installed therein) is locked into the carrier bracket 555, and securely held in place.

Figure 6A:
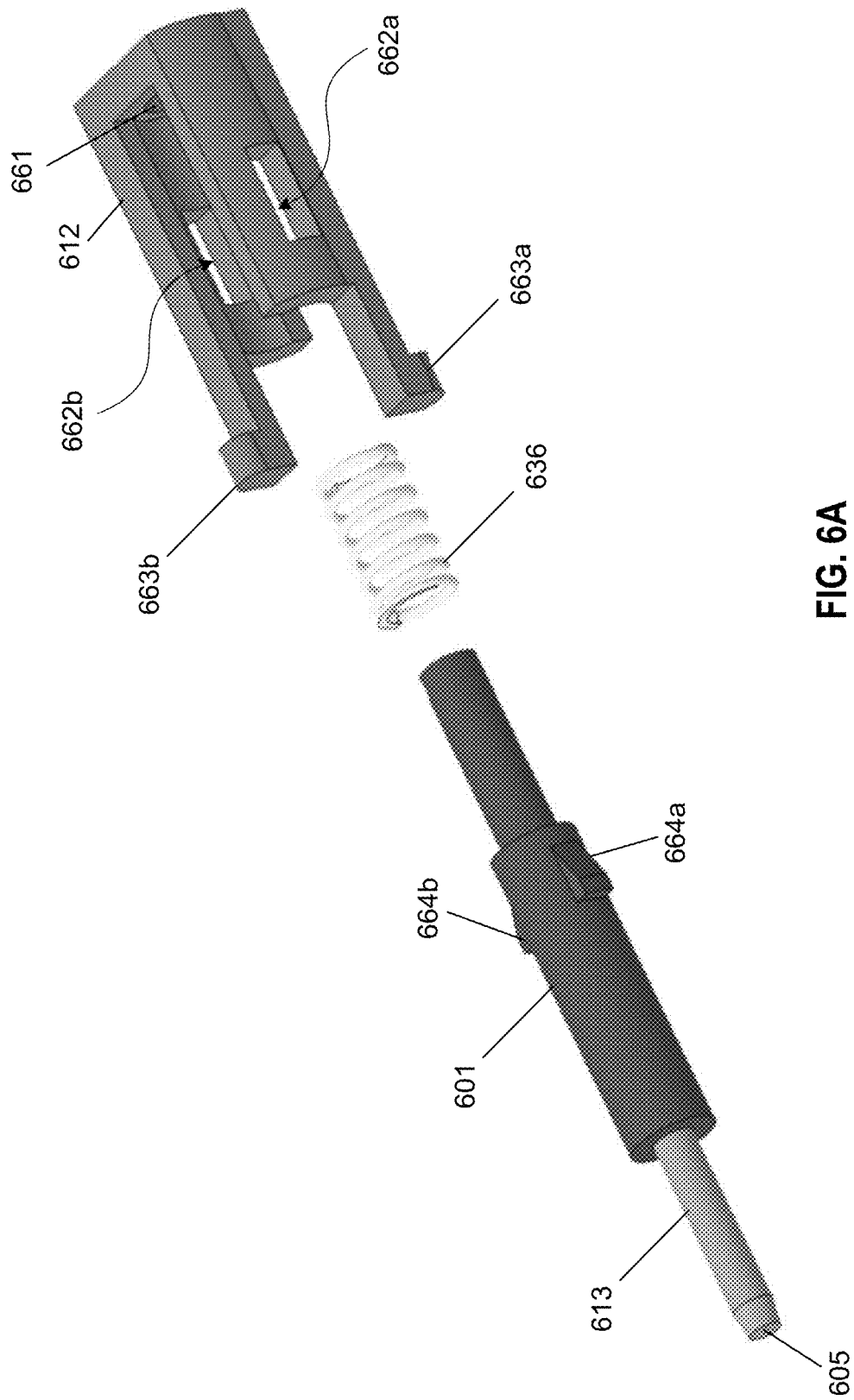
FIG. 6A is an exploded view of the simplex ferrule, the simplex ferrule holder, and its components, according to some embodiments.

FIG. 6A is an exploded view of a simplex ferrule 613, ferrule flange 601, simplex ferrule holder 612 and its components. The simplex ferrule 613 includes an end-face 605 at its distal end. The end-face 605 may be asymmetrical (e.g., angled) or symmetrically shaped. At the opposite end of the simplex ferrule 613 is the ferrule flange 601. The flange 601 is shown to include two ferrule latching tabs 664a, 664b. The ferrule latching tabs 664a, 664b can be a retention mechanism used to firmly connect the simplex ferrule 613 to the simplex ferrule holder 612 as it is installed. The ferrule latching tabs 664a, 664b tabs extend from opposing sides of the flange 601, being positioned near its distal end so as to catch onto two complimentary latching holes 662a, 622b on the simplex ferrule holder 612.

The flange 601 is also shown to have a flange spring 636. As seen, the front portion (e.g., proximate to the simplex ferrule 613) of the flange 601 has a wider diameter than the back portion (e.g., proximate of the simplex ferrule holder 612) of the flange 601. The narrow width at the back of the flange 601 allows for the flange spring 636 to be wrapped over this portion. The flange spring 636 spring allows for the simplex ferrule holder 612 to move towards and away from the end-face 605. The flange spring 636 slides over the thinner portion of the flange 601 and bottoms out on when it touches the large diameter portion of the flange 601. When then simplex ferrule holder 612 is installed, the ferrule latching tabs 663a, 663b retain the simplex ferrule holder 612 to the ferrule 613. Also, the simplex ferrule holder 612 can be pushed towards the end-face 605, and the flange spring 636 will spring back when the holder 612 is released. For instance, the flange spring 636 can provide positive mating pressure for the simplex ferrule 613 within the cavity of the simplex ferrule interface in order for the simplex ferrule 613 to be mated and stably retained therein. Additionally, the flange spring 636 has flat surfaces on both ends (e.g., the end facing the flange 601, and the end facing the simplex ferrule holder 612) which allows the simplex ferrule 613 to rotate about the ferrule flange 601 and the base of the simplex ferrule holder 612.

The configuration for the simplex ferrule holder 612 is shown to include: two latching tabs 663a, 633b; two ferrule latching holes 662a, 662b; and a ferrule holder base pocket 661. The latching tabs 663a, 633b are retention mechanisms, which are employed for retaining the ferrule holder 612 (having the simplex ferrule 613 installed therein) to the carrier bracket (as shown in FIG. 5K). The latching tabs 663a, 633b are shown as protruding portions at the distal end of the holder 612. The tabs 663a, 633b extend outward from the holder's 612 body, so that they can catch behind the inside wall of the carrier bracket. Ferrule latching holes 662a, 662b can be openings along opposite sides of the holder's 612 body. The ferrule latching holes 662a, 662b are structured to be complimentary to the ferrule latching tabs 664a, 664b on the flange 601. The ferrule latching holes 662a, 662b may be larger than the ferrule latching tabs 664a, 664b to allow the ferrule to rotate freely. This ability to rotate may be optimal in configurations where the end-face 605 of the ferrule 613 is shaped (e.g., APC—Angled Physical Contact). In other words, a simplex ferrule 613 may require rotational alignment for its angled end-face 605 to fully seat against the end-face of a simplex ferrule interface's cavity (shaped having a complimentary angle). The ferrule holder base pocket 661 may be a slightly recessed, or indented, section on the bottom (inside) surface at the holder's 612 base. The ferrule holder base pocket 661 is structured for receiving the flat surface at the end of the flange spring 636. In other words, the flat surface of the flange spring 636 can go into the dent of the ferrule holder base pocket 661, and press firmly against the flat surface at the back of the pocket 661.

FIG. 6B is a perspective view of the simplex ferrule 613 installed in the simplex ferrule holder 612. FIGS. 6B-6E shows a substantially similar structure and function of the simplex ferrule 613 and simplex ferrule holder 612 previously discussed in FIG. 6A above. Thus, for purposes of brevity, structures and functions that are the same as previously described are not discussed in detail again in reference to FIGS. 6B-6E. FIG. 6B also shows the fiber waveguide 611 terminated to the simplex ferrule 613. This example also illustrates the ferrule latching tab 664a on the flange 601 being latched through the ferrule latching hole 662a on the simplex ferrule holder 612. Further, FIG. 6B depicts that the flange spring 636 is structured to be placed around the distal end of the flange 601. Accordingly, one end of the flange spring 636 seats against the back surface of simplex ferrule holder 612, and the opposite end of the flange spring 636 seats against the body of the flange 601 at an edge (to the section of the flange 610 having a wider diameter).

FIG. 6C is a cross-sectional view of the simplex ferrule 613 installed in the simplex ferrule holder 612. Particularly, this example depicts the flat surfaces at both ends of the flange spring 636. One end of the flange spring 636 seats against the back surface of simplex ferrule holder 612, and the opposite end of the flange spring 636 seats against an edge in the flange 601, which allows the simplex ferrule 613 to rotate about the base of the simplex ferrule holder 612 and the flange 601.

FIG. 6D is a side view of the simplex ferrule 613 installed in the simplex ferrule holder 612. Further, this example shows that the end-face 605 of the simplex ferrule 613 can be shaped (e.g., APC).

Figure 6E:
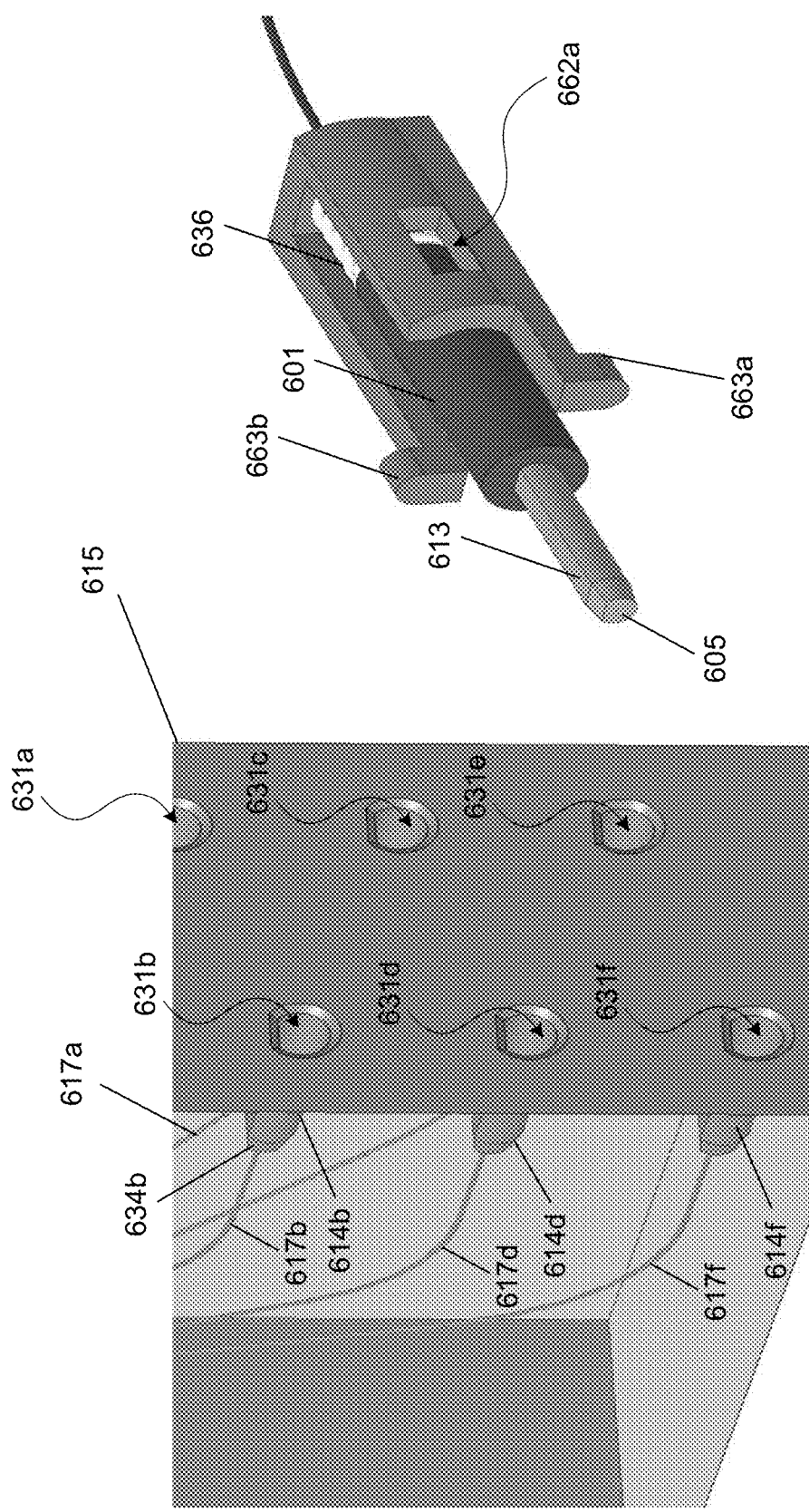
FIG. 6E illustrates the simplex ferrule installed in the simplex ferrule holder shown in FIG. 6B, positioned to be installed in the RWG block, according to some embodiments.

FIG. 6E illustrates the simplex ferrule 613 installed in the simplex ferrule holder 612 proximate to simplex ferrule interfaces 214a-214f in the RWG block 615. According to the embodiments, each of the simplex ferrule interfaces 214a-214f has a corresponding cavity 631a-631f and interfaces to a corresponding fixed waveguide 217a-217f. The body of the simplex ferrule 613 may be keyed as a self-alignment feature. As seen, the top surface along the length of the simplex ferrule's 613 body is flat. Accordingly, each of the cavities 631a-631f may be complimentary keyed, being flattened at their top surfaces. Thus, as a simplex ferrule 613 is inserted into a cavity, for instance 631*a*, the ferrule 613 properly fits inside when its flat top surface is properly aligned with the flat top surface of the cavity 631*a*. Consequently, the keying features ensures that the end-face 605 of the simplex ferrule 613 is properly aligned with the complimentary shaped end-face 334*a*-334*f* of a respective cavity 631*a*-631*f*, when installed.

Figures 7A, 7B:
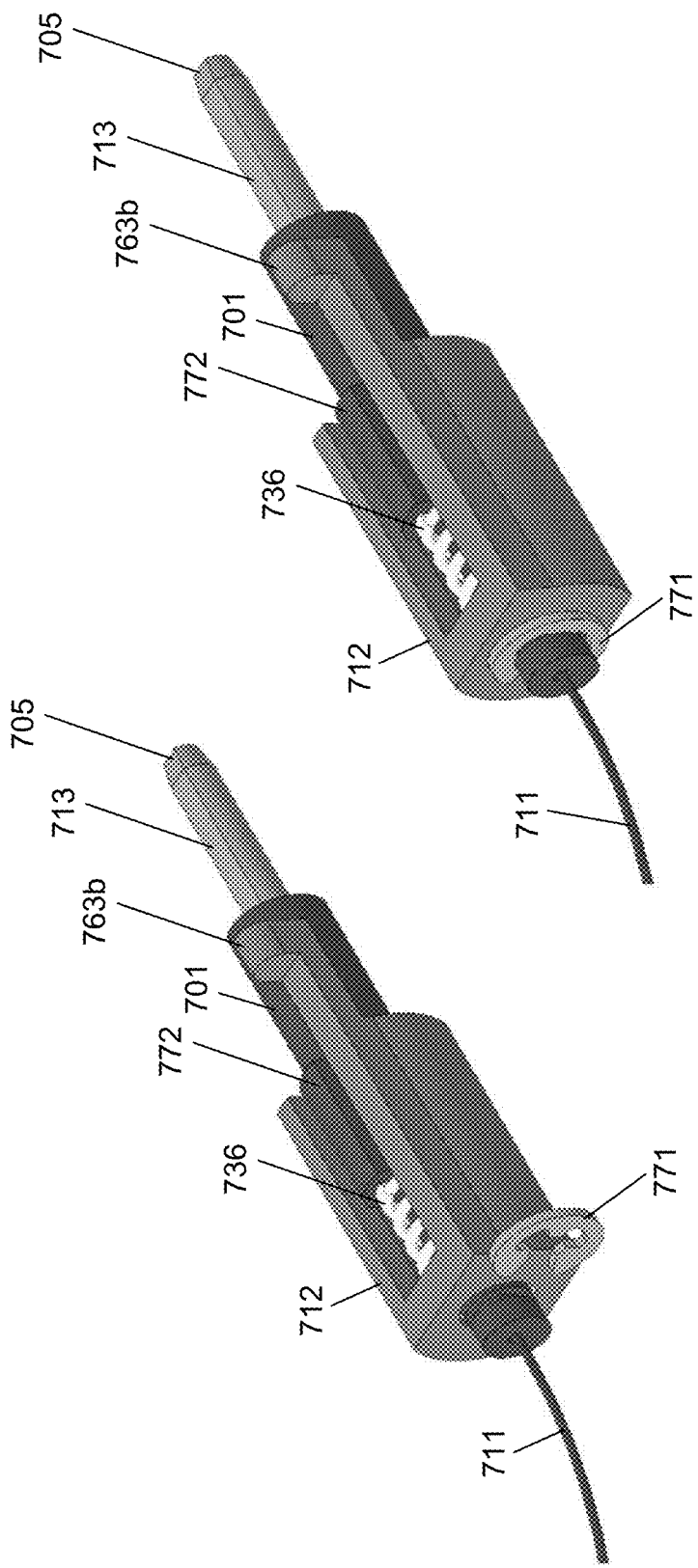
FIG. 7A depicts a perspective view of another configuration for a simplex ferrule and simplex ferrule holder including an e-clip, according to some embodiments.
FIG. 7B depicts a perspective view of the simplex ferrule and simplex ferrule holder shown in FIG. 7A with the e-clip installed thereon, according to some embodiments.

In FIG. 7A, an example of an alternative design for the simplex ferrule 713 and the simplex ferrule holder 712 is shown. Generally, this configuration varies from the previously described configuration with respect to FIGS. 6A-6E, by using different forms of retaining and alignment features. Although the flange 701 and simplex ferrule holder 712 designs in FIG. 7A may vary from those discussed above, the designs are similar in that they allow the flange 701 to rotatably move within the simplex ferrule holder 712 within a limited range for the simplex ferrule 713 to self-align within a cavity of a simplex ferrule interface (so that ferrule end-face will properly seat with respect to cavity end-face). In the illustrated example, the simplex ferrule 713 is shown to have an end-face 705. The flange 701 in shown to include: a ferrule flange protrusion 772; flange spring 736; and a fiber waveguide 711 terminated thereto. The simplex ferrule holder 712 is shown to include: a holder latching tab 763*b* (two tabs although one shown); and an e-clip 771.

Particularly, the configuration in FIG. 7A employs an e-clip 771 to hold the flange 701 to the simplex ferrule holder 712 (as opposed to latches and holes shown in FIG. 6A). As used herein, an e-clip can refer to a type of retainer used as a locking mechanism, having a general shape that resembles an "E" shape, and having a side with an opening. Additionally, there is a ferrule flange protrusion 772 that limits rotation of ferrule holder 712. The simplex ferrule holder 712 can be rotated to slide a holder latching tab 763*a* into notches to be retained, which locks the holder 712 in position in a carrier bracket. While rotating the simplex ferrule holder 712, the ferrule flange protrusion 772 may come into contact with a surface of the holder 712 to forcibly stop its rotation at a certain point. This prevents the simplex ferrule holder 712 from being improperly rotated into a position that may damage or misalign the simplex ferrule 713.

FIG. 7B shows a similar perspective of the simplex ferrule 713 installed in the simplex ferrule holder 712 with respect to the e-clip 771 design. However, FIG. 7B also illustrates the e-clip 771 functioning as a retaining ring, which holds onto a back-end shaft of the flange 701 (behind the simplex ferrule holder 712) when installed inside of a groove of the e-clip 771.

Figure 7C:
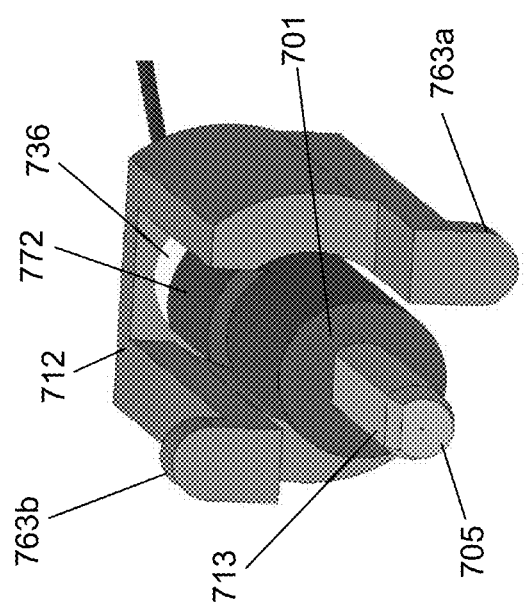
FIG. 7C depicts a front view of the simplex ferrule and simplex ferrule holder shown in FIG. 7A, according to some embodiments.
Figure 7D:
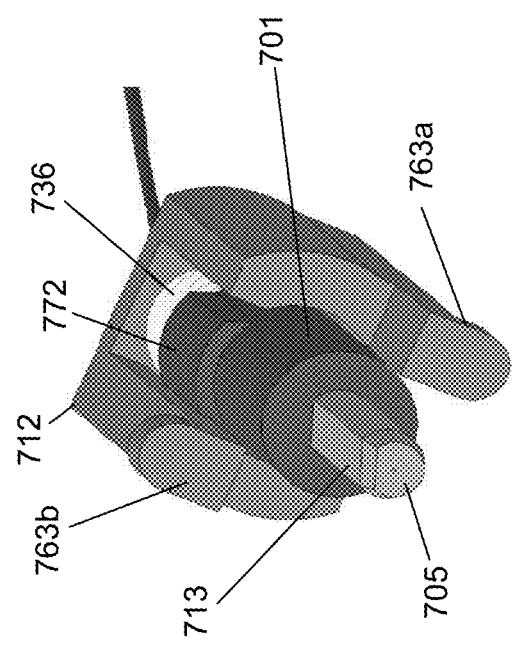
FIG. 7D depicts another front view of the simplex ferrule and simplex ferrule holder shown in FIG. 7A, according to some embodiments.

Referring now to FIG. 7C and FIG. 7D, front views of the simplex ferrule 713 installed in the simplex ferrule holder 712, with respect to the e-clip 771 design, are shown. In FIG. 7C, the latching tabs 763*a*, 763*b* of the simplex ferrule holder 712 are prominently shown. Also, an example of the ferrule flange protrusion 772 contacting an edge (on the right) of the simplex ferrule holder 712 is depicted. Accordingly, in this shown position, the ferrule flange protrusion 772 stops rotation of the simplex ferrule holder 712 any further in this direction.

FIG. 7D illustrates an example of the simplex ferrule holder 712 in a rotated position (counterclockwise from the previous position shown in FIG. 7C). In this configuration, the simplex ferrule holder 712 can be locked into position in a carrier bracket, thereby being stably retained in the RWG block assembly.

In FIG. 7E an example of an array of simplex ferrules 712*a*-712*c* in simplex ferrule holders 713*a*-713*c* having respective e-clips 771*a*-771*c*, are shown being installed in respective simplex ferrule interfaces 714*a*-714*c*. As shown, the end-faces 705*a*-705*c* of the simplex ferrules 713*a*-713*c* may be shaped (e.g., PC, APC, etc.), in a configuration that is complementary to the end-faces 734*a*-734*c* of the cavities 731*a*-731*c*.

FIG. 7F is a close-up view of the end-faces 705*d*, 705*e* of the simplex ferrules 713*d*, 713*e* and the end-faces 734*d*, 734*e* of the cavities 731*d*, 731*e*. In this example, the complimentary angled shapes of the end-faces 705*d*, 705*e* (of the simplex ferrules 713*d*, 713*e*) and the end-faces 734, 734*e* (of the cavities 731*d*, 731*e*) are visible. Due to these complimentary shaped surfaces, once the simplex ferrules 713*d*, 713*e* are fully installed in the simplex ferrule interfaces 714*d*, 714*e*, the end-faces 705*d*, 705*e* can have full contact with the end-faces 734*d*, 734*e* in a manner that reduces optical loss.

Now referring to FIG. 8A and FIG. 8C, examples of the ferrule insertion and self-aligning features of the disclosed embodiments are shown. FIG. 8A and FIG. 8C show a substantially similar structure and function of the simplex ferrule 613 and simplex ferrule holder 612 previously discussed in FIGS. 6A-6E above. Thus, for purposes of brevity, structures and functions that are the same as previously described are not discussed in detail again in reference to FIG. 8A and FIG. 8C. Particularly, in FIG. 8A, the distal end of the simplex ferrule 613 is shaped (e.g., chamfered) for a lead-in into a shaped opening of the cavity 631. That is, the cavity 631 opening can be particularly structured with a complementary lead-in feature 681 for receiving the simplex ferrule 613 having a specifically shaped end-face 605.

FIG. 8B shows a substantially similar structure and function of the simplex ferrule 713 and simplex ferrule holder 712 having an e-clip 771, as previously discussed in FIGS. 7A-7F above. Thus, for purposes of brevity, structures and functions that are the same as previously described are not discussed in detail again in reference to FIG. 8B. Particularly, the simplex ferrule 713 is keyed, as previously described. Due to the keyed structure, the simplex ferrule 713 can self-align, upon being inserted within a complementarily keyed cavity 731. Accordingly, the end-face 705 of the simplex ferrule 713 and the end-face 734 of the cavity 731 are both distinctly structured to be complementarily seated.

In FIG. 8C, the simplex ferrule 613 is shown to have a round shape to its body (as opposed to the keyed ferrule shown in FIG. 8B). Thus, in this configuration, the simplex ferrule 613 is designed to self-align neat to the end of a bottom-out inside of the cavity 631. FIG. 8C illustrates an example of the end-face 605 of the simplex ferrule 613 being complementarily seated within the end-face 634 of the cavity 631.

Accordingly, the RWG block assembly and techniques described herein provide modularly configurable fiber shuffles. As an example of a practical application, the RWG block assembly can be used to flexibly connect multiple first parallel-fiber ferrules within a system to multiple second parallel-ferrules modularly, resulting in a fiber shuffle that can be reconfigurable. Further, the parallel-fiber ferrule can be implemented as a chip ferrule or midplane blindmate ferrule (e.g., MTs or PMTs in any blindmate housing). The second parallel-fiber ferrules can be implemented as faceplate-mounted ferrules (e.g., MTs in MPO housings). Moreover, as alluded to above, the RWG block assembly realizes various other advantages such as fast turn-around for manufacturing; field reconfigurability; low-cost fiber shuffles; simplified fiber shuffles; and high-performance (low-loss) simplex ferrule interface.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An assembly comprising:
   a reconfigurable waveguide (RWG) block housing to receive a RWG block; and
   a carrier bracket coupled to the RWG block housing, the carrier bracket to receive a plurality of simplex ferrules such that each of the plurality of simplex ferrules can be positioned modularly within the carrier bracket, wherein each of the plurality of simplex ferrules are installed within a corresponding simplex ferrule holder; and
   the RWG block comprising:
   a parallel-fiber ferrule interface to receive a parallel-fiber ferrule;
   a plurality of simplex ferrule interfaces to receive the plurality of simplex ferrules, wherein the plurality of simplex ferrule interfaces are positioned at a different side of the assembly from the parallel-fiber ferrule interface and each of the plurality of simplex ferrules interfaces receives one simple ferrule; and
   a plurality of fixed waveguides embedded within a material of the RWG block and terminating to the plurality of simplex ferrule interfaces, each of the plurality of fixed waveguides corresponding to an individual simplex ferrule interface of the plurality of simplex ferrule interfaces and extending from an end-face of the individual simplex ferrule interface to the parallel-fiber ferrule interface to couple the parallel-fiber ferrule received by the parallel-fiber ferrule interface to the one or more simplex ferrules received by the plurality of simplex ferrule interfaces within the RWG block.

2. The assembly of claim 1, wherein each simplex ferrule holder comprises:
   holder latching tabs to retain the simplex ferrule holder within the carrier bracket; and
   latching holes to retain the simplex ferrule installed in the simplex ferrule holder.

3. The assembly of claim 2, wherein the simplex ferrule is coupled to a flange, and the
   a flange comprises:
   latching tabs to insert into the latching holes of the simplex ferrule holder.

4. The assembly of claim 1, wherein the simplex ferrule is coupled to a flange, and the
   a flange comprises:
   a ferrule flange protrusion to limit rotational movement of the simplex ferrule within a simplex ferrule interface.

5. The assembly of claim 4, wherein each simplex ferrule holder comprises:
   holder latching tabs to retain the simplex ferrule holder within the carrier bracket; and
   a clip to stably attach the flange of the simplex ferrule to the simplex ferrule holder.

\* \* \* \* \*